US012482323B2

(12) United States Patent
Rizos et al.

(10) Patent No.: US 12,482,323 B2
(45) Date of Patent: Nov. 25, 2025

(54) ELECTRONIC GAMING MACHINES WITH OUT-OF-PROCESS RENDERING

(71) Applicant: Aristocrat Technologies Australia Pty Limited, North Ryde (AU)

(72) Inventors: Thomas Rizos, Austin, TX (US); Donovan David Meyer, Austin, TX (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 18/393,569

(22) Filed: Dec. 21, 2023

(65) Prior Publication Data

US 2024/0242560 A1 Jul. 18, 2024

Related U.S. Application Data

(63) Continuation of application No. 18/145,514, filed on Dec. 22, 2022, now Pat. No. 11,893,852, which is a continuation of application No. 16/949,833, filed on Nov. 16, 2020, now Pat. No. 11,562,616, which is a continuation of application No. 16/362,425, filed on Mar. 22, 2019, now Pat. No. 10,896,567.

(51) Int. Cl.
*G07F 17/32* (2006.01)

(52) U.S. Cl.
CPC ...... *G07F 17/3211* (2013.01); *G07F 17/3223* (2013.01)

(58) Field of Classification Search
None
See application file for complete search history.

(56) References Cited

U.S. PATENT DOCUMENTS

| | | | |
|---|---|---|---|
| 7,736,234 | B2 | 6/2010 | Cockerille |
| 7,749,081 | B1 | 7/2010 | Acres |
| 7,806,764 | B2 | 10/2010 | Brosnan |
| 8,475,273 | B2 | 7/2013 | Kelly |
| 8,672,750 | B2 | 3/2014 | Nelson |
| 8,777,737 | B2 | 7/2014 | Lemay |
| 8,968,105 | B2 | 3/2015 | Adiraju |
| 9,129,470 | B2 | 9/2015 | Kelly |
| 11,562,616 | B2 | 1/2023 | Rizos |

(Continued)

OTHER PUBLICATIONS

Notice of Allowance dated Oct. 16, 2020 for U.S. Appl. No. 16/362,425 (pp. 1-8).

(Continued)

*Primary Examiner* — Peter J Iannuzzi
(74) *Attorney, Agent, or Firm* — Weaver Austin Villeneuve & Sampson LLP

(57) ABSTRACT

An electronic gaming machine architecture is provided in which a gaming platform application and wagering game applications are executed in separate processes but may share access to common display windows; such display windows may be caused to be generated by the gaming platform application, which may then assign specific display windows to the various wagering game applications, along with window handles usable to direct graphical content thereto. The wagering game applications may then direct graphical content to the display windows, while the gaming platform application may retain control over the size, position, transparency, and/or z-order of the display windows.

20 Claims, 13 Drawing Sheets

(56) References Cited

U.S. PATENT DOCUMENTS

| | | | | |
|---|---|---|---|---|
| 2003/0064801 | A1 | 4/2003 | Breckner | |
| 2003/0078103 | A1 | 4/2003 | Lemay | |
| 2004/0082385 | A1 | 4/2004 | Silva | |
| 2007/0079252 | A1 * | 4/2007 | Ramnani | G06F 9/451 715/781 |
| 2012/0204153 | A1 * | 8/2012 | Peterson | G06F 11/3672 717/124 |
| 2017/0061728 | A1 * | 3/2017 | Cannon | G07F 17/326 |

OTHER PUBLICATIONS

NCompass v2.5.x Operator's Guidebook, Aristocrat, 106 pages, Jun. 29, 2018.
Office Action (Non-Final Rejection) dated Jun. 24, 2022 for U.S. Appl. No. 16/949,833 (pp. 1-5).
Office Action (Notice of Allowance and Fees Due (PTOL-85)) dated Oct. 5, 2022 for U.S. Appl. No. 16/949,833 (pp. 1-5).
Office Action dated Jun. 25, 2020 for U.S. Appl. No. 16/362,425 (pp. 1-8).
Office Action (Non-Final Rejection) dated Aug. 31, 2023 for U.S. Appl. No. 18/145,514 (pp. 1-6).
Office Action (Notice of Allowance and Fees Due (PTOL-85)) dated Nov. 1, 2023 for U.S. Appl. No. 18/145,514 (pp. 1-5).
Australian Examination Report No. 1 issued in App. No. AU2019203022, dated Jan. 3, 2025, 5 pages.

* cited by examiner

ELECTRONIC GAMING MACHINES WITH OUT-OF-PROCESS RENDERING

RELATED APPLICATION(S)

This application is a continuation application under 35 U.S.C. § 120 of U.S. patent application Ser. No. 18/145,514, titled "ELECTRONIC GAMING MACHINES WITH OUT-OF-PROCESS RENDERING" and filed Dec. 22, 2022, which is itself a continuation of U.S. patent application Ser. No. 16/949,833, titled "ELECTRONIC GAMING MACHINES WITH OUT-OF-PROCESS RENDERING," filed Nov. 16, 2020, and issued as U.S. Pat. No. 11,562,616 on Jan. 24, 2023, which is itself a continuation of U.S. patent application Ser. No. 16/362,425, titled "ELECTRONIC GAMING MACHINES WITH OUT-OF-PROCESS RENDERING," filed Mar. 22, 2019, and issued as U.S. Pat. No. 10,896,567 on Jan. 19, 2021, each of which is hereby incorporated herein by reference in its entirety and for all purposes.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

An electronic gaming machine architecture is provided that includes a gaming machine platform application and one or more wagering game applications that are each executed as separate processes by the controller of the electronic gaming machine. The gaming platform application may be configured to cause the electronic gaming machine to instantiate one or more display windows on one or more displays of the electronic gaming machine; each such display window may be associated with a window handle that is provided to the gaming platform application to allow the gaming platform application to control the corresponding display window. The gaming platform application may be further configured to assign a display window, or multiple display windows, to each executing wagering game application; the wagering game application(s) may then output graphical content to the display window(s) assigned thereto using the associated window handle(s).

In such an architecture, both the gaming platform application and the wagering game application(s) may be provided with the handles for a particular display window, allowing both types of applications to control the formatting, e.g., size, position, z-order, transparency, etc., and graphical content of such a display window. Generally speaking, the wagering game applications may be configured to direct graphical content to the display window(s) assigned thereto, whereas the gaming platform application may be configured to retain control of the formatting of such display windows. Thus, the gaming platform application may control the arrangement of display windows on the electronic gaming machine relative to each other, the z-order of such display windows, the transparency of such display windows, and so forth. This allows the gaming machine platform to manage the independent presentation of multiple wagering games on one electronic gaming machine simultaneously.

Electronic gaming machines have historically been configured to each offer play of only a single type of wagering game; in many cases, the entire design of the electronic gaming machine cabinet may be tied in to the theme of the wagering game offered thereupon, e.g., silkscreened graphical elements (such as topper signage, button deck graphics, etc.), colored lighting effects, the style of the player's chair (if present), etc. may be designed to complement the visual theme of the wagering game.

Due to the large number of peripherals included in electronic gaming machines, e.g., bill acceptors, ticket printers, ticket readers, player loyalty card readers, coin dispensers, secure communications interfaces, multiple displays, audio devices, movable game elements, etc., electronic gaming machines have conventionally included "gaming platform applications" that are configured to manage the interfaces between such peripherals and the wagering game applications offered thereupon. Such conventional gaming platform applications have typically been configured to, after performing initial diagnostic checks of the electronic gaming machine hardware, load a binary file or files into memory that contain the compiled computer-executable instructions for providing a wagering game and to then execute such instructions in order to provide the wagering game. Thus, the wagering game is simply an extension of the gaming platform application itself in conventional electronic gaming machines. Because the wagering game is simply executed as part of the gaming platform application in such electronic gaming machines, the wagering game is able to route all input and output, including graphical output, through the gaming platform application in order to display wagering game content. From a computing resource perspective, such implementations generally result in a single process that is managed by the operating system of the electronic gaming machine and that provides both the primary gaming platform functionality and the wagering game functionality. Such a single-process implementation, however introduces potential issues. For example, if the wagering game experiences an unhandled error and crashes, this would generally cause the entire gaming platform application to crash and would require that the electronic gaming machine be rebooted or reset in order to restore the electronic gaming machine to a functional state.

In the architecture described herein, however, the gaming platform application and the wagering game application(s) may be executed as separate processes that share display window resources. By decoupling the gaming platform application from the wagering game application from a process perspective, electronic gaming machines implementing such architectures can recover from crashes of wagering game applications without requiring a reboot or reset of the entire electronic gaming machine. The gaming platform application, because it is executing in a separate process from the wagering game application, will simply continue to operate in its own process even if another process for the wagering game application crashes due to an error.

The robustness of such an architecture provides several benefits. As a first matter, the gaming platform application may, for example, be configured to monitor the health of a process or processes associated with one or more wagering game applications that are currently executing and, if a process for a particular wagering game application is identified as having unexpectedly terminated or become non-responsive, cause such a wagering game application to be re-executed (and the non-responsive process(es), if present, to be terminated).

Another benefit is that the gaming platform may facilitate the flexible presentation of wagering game applications—for example, an electronic gaming machine may have a large number of wagering game applications, e.g., up to 10, 20, 30, 40, 50, 60, 70, 80, 90, or 100, or even more than 100, wagering game applications stored in memory (or downloadable from a central wagering game application repository, e.g., from a network server). The gaming platform application may be configured to present a graphical user interface (GUI) that permits a player to select any of these wagering game applications for play, or even to select multiple such wagering game applications for play; each such wagering game application may be independently executed as a separate process. Due to the separation between the gaming platform application process and the wagering game application processes, a crash of any single one of the wagering game applications will not necessarily negatively impact the operation of the remaining wagering game applications or the gaming platform application. This is particular important due to the financial stakes involved with wagering game applications-players are understandably upset when a wagering game crashes, as they may fear the loss of accumulated credits or may think that the wagering game crashed just as they were about to obtain a large winning outcome. Players would be even more upset if a wagering game application crash not only resulted in uncertainty about the winnings or potential outcomes in the wagering game application that crashed, but also resulted in other wagering game applications provided by the same gaming machine crashing, which would be the case if the gaming platform application and the wagering game applications were all provided through a single, unified process.

A third benefit that arises from the use of such an architecture is that the gaming platform application may maintain control of the display window formatting, allowing for centralized management of display window placement, z-order, size, transparency, etc. This allows the gaming platform application, for example, to make determinations as to how to best arrange the various display windows based on information that it receives from the various executing wagering game applications.

In some implementations, an electronic gaming machine may be provided that includes one or more display devices, one or more processors, and one or more memory devices. In such implementations, the one or more display devices, the one or more processors, and the one or more memory devices may be operably connected, and the one or more memory devices may store computer-executable instructions for controlling the one or more processors to cause: an operating system for the electronic gaming machine to be executed, a gaming platform application to be executed as one or more first processes in the operating system, the gaming platform application to cause a plurality of display windows to be instantiated on the one or more display devices, each display window having a corresponding window handle, the gaming platform application to obtain the window handle for each display window instantiated by the gaming platform application, one or more wagering game applications to be executed as one or more respective second processes in the operating system (each second process may be separate from the first process), the gaming platform application to assign a display window to each wagering game application of the one or more wagering game applications and to provide each wagering game application with the window handle associated with each display window assigned thereto, and each wagering game application to output graphical content for a wagering game to the display window associated therewith using the corresponding window handle.

In some implementations, the one or more memory devices may further store computer-executable instructions for further controlling the one or more processors to cause the gaming platform application to manage one or more of size, location, z-order, and transparency of each display window of the plurality of display windows while each wagering game application is outputting graphical content.

In some implementations, the one or more memory devices may further store computer-executable instructions for further controlling the one or more processors to cause: each wagering game application to provide game event messages to the gaming platform application indicative of wagering game events in the wagering game provided by that wagering game application and the gaming platform application to manage one or more of size, location, z-order, and transparency of each of the plurality of the display windows based on the wagering game events.

In some implementations, the one or more wagering games may be a plurality of wagering games, and the one or more memory devices may further store computer-executable instructions for further controlling the one or more processors to cause: the gaming platform application to identify a first wagering game application of the plurality of wagering game applications that has provided a first game event message (i) of the game event messages and (ii)

indicating that a winning outcome is to be displayed in the display window assigned to the first wagering game application and to cause one or more of the display windows to be modified in advance of the display of the winning outcome and responsive to receipt of the first game event message by performing one or more actions such as: (a) increasing the size of the display window assigned to the first wagering game application, (b) moving the display window assigned to the first wagering game application to a new location on the one or more displays, (c) causing a display window of the plurality of display windows that is not assigned to one of the wagering game applications to display graphical content in a region that surrounds the display window assigned to the first wagering game application, (d) causing the display window assigned to the first wagering game application to cyclically expand and contract in size, and/or (e) causing one or more display windows of the plurality of display windows that are not assigned to the wagering game applications to display a semi-transparent, uniform color field over all of the display windows assigned to the wagering game applications except for the display window assigned to the first wagering game application.

In some implementations, the one or more memory devices may further store computer-executable instructions for further controlling the one or more processors to cause the gaming platform application to output first graphical content on a first display window of the display windows, where the first display window is not assigned to any of the one or more wagering game applications.

In some implementations, the first graphical content may be (a) a graphical user interface configured to allow a player to select a wagering game for play on the electronic gaming machine from a plurality of wagering games for selection, (b) a graphical user interface for presenting multimedia content offered by an operator of the electronic gaming machine, (c) a graphical user interface for communicating with one or more users of other electronic gaming machines, (d) a graphical user interface for accessing administrative options for the electronic gaming machine, or (e) a graphical user interface for accessing audit functionality offered by the electronic gaming machine.

In some implementations, the one or more memory devices may further store computer-executable instructions for further controlling the one or more processors to cause the gaming platform application to output the first graphical content on the first display window while the first display window overlaps with and is on top of at least one or more of the one or more display windows assigned to the one or more wagering game applications.

In some implementations, the one or more memory devices may further store computer-executable instructions for further controlling the one or more processors to cause: each wagering game application to provide game event messages to the gaming platform application indicative of wagering game events in the wagering game provided by that wagering game application and to cause the gaming platform application to, responsive to receipt of one or more of the game event messages, cause data representing the graphical content of at least the display window assigned to the wagering game application that originated the one or more game event messages to be saved on the one or more memory devices.

In some implementations, the one or more memory devices may further store computer-executable instructions for further controlling the one or more processors to not assign a first display window of the plurality of display windows to any of the wagering game applications and to control the first display window to have a z-order that places the first display window in front of one of the display windows assigned to a wagering game application of the one or more wagering game applications.

In some implementations, the one or more memory devices may further store computer-executable instructions for further controlling the one or more processors to cause the gaming platform application to: a) monitor the one or more second processes of each executing wagering game application, b) determine whether an instance of a first executing wagering game application of the one or more wagering game applications has become non-responsive or unexpectedly terminated based on (a), c) cause, responsive to (b), a new instance of the first wagering game application to be executed as another one or more second processes separate from the one or more first processes, d) assign a display window such as i) the display window assigned to the instance of the first executing wagering game application or ii) a newly created display window to the new instance of the first wagering game, and e) provide, to the new instance of the first wagering game, the window handle for the display window assigned to the new instance of the first wagering game.

In some implementations, a method may be provided that includes causing one or more processors of an electronic gaming machine to execute an operating system for the electronic gaming machine, causing the one or more processors of the electronic gaming machine to execute a gaming platform application as one or more first processes in the operating system, causing the one or more processors of the electronic gaming machine to, through execution of the gaming platform application, cause a plurality of display windows to be instantiated on the one or more display devices, each display window having a corresponding window handle, causing the one or more processors of the electronic gaming machine to, through execution of the gaming platform application, obtain the window handle for each display window instantiated by the gaming platform application, causing the one or more processors of the electronic gaming machine to execute one or more wagering game applications as one or more respective second processes in the operating system, where each second process is separate from the first process, causing the one or more processors of the electronic gaming machine to, through execution of the gaming platform application, assign a display window to each wagering game application of the one or more wagering game applications and to provide each wagering game application with the window handle associated with each display window assigned thereto, and causing the one or more processors of the electronic gaming machine to cause each wagering game application to output graphical content for a wagering game to the display window associated therewith using the corresponding window handle.

In some implementations, the method may further include causing the one or more processors of the electronic gaming machine to, through execution of the gaming platform application, manage one or more of size, location, z-order, and transparency of each display window of the plurality of display windows while each wagering game application is outputting graphical content.

In some implementations, the method may further include causing the one or more processors of the electronic gaming machine to, through execution of the one or more wagering game applications, cause each wagering game application to provide game event messages to the gaming platform application indicative of wagering game events in the wagering game provided by that wagering game application and causing the one or more processors of the electronic gaming machine to, through execution of the gaming platform application, manage one or more of size, location, z-order, and transparency of each of the plurality of the display windows based on the wagering game events.

In some implementations, the one or more wagering games may be a plurality of wagering games, and the method may further include causing the one or more processors of the electronic gaming machine to, through execution of the gaming platform application, identify a first wagering game application of the plurality of wagering game applications that has provided a first game event message (i) of the game event messages and (ii) indicating that a winning outcome is to be displayed in the display window assigned to the first wagering game application and causing the one or more processors of the electronic gaming machine to, through execution of the gaming platform application, modify one or more of the display windows in advance of the display of the winning outcome and responsive to receipt of the first game event message by performing one or more actions such as: (a) increasing the size of the display window assigned to the first wagering game application, (b) moving the display window assigned to the first wagering game application to a new location on the one or more displays, (c) causing a display window of the plurality of display windows that is not assigned to one of the wagering game applications to display graphical content in a region that surrounds the display window assigned to the first wagering game application, (d) causing the display window assigned to the first wagering game application to cyclically expand and contract in size, and/or (e) causing one or more display windows of the plurality of display windows that are not assigned to the wagering game applications to display a semi-transparent, uniform color field over all of the display windows assigned to the wagering game applications except for the display window assigned to the first wagering game application.

In some implementations, the method may further include causing the one or more processors of the electronic gaming machine to, through execution of the gaming platform application, output first graphical content on a first display window of the display windows, where the first display window is not assigned to any of the one or more wagering game applications.

In some implementations, the first graphical content may be: (a) a graphical user interface configured to allow a player to select a wagering game for play on the electronic gaming machine from a plurality of wagering games for selection, (b) a graphical user interface for presenting multimedia content offered by an operator of the electronic gaming machine, (c) a graphical user interface for communicating with one or more users of other electronic gaming machines, (d) a graphical user interface for accessing administrative options for the electronic gaming machine, or (e) a graphical user interface for accessing audit functionality offered by the electronic gaming machine.

In some implementations, the method may further include causing the one or more processors of the electronic gaming machine to, through execution of the gaming platform application, output the first graphical content on the first display window while the first display window overlaps with and is on top of at least one or more of the one or more display windows assigned to the one or more wagering game applications.

In some implementations, the method may further include causing the one or more processors of the electronic gaming machine to: cause each wagering game application to provide game event messages to the gaming platform application indicative of wagering game events in the wagering game provided by that wagering game application; and cause the gaming platform application to, responsive to receipt of one or more of the game event messages, cause data representing the graphical content of at least the display window assigned to the wagering game application that originated the one or more game event messages to be saved on the one or more memory devices.

In some implementations, the method may further include causing the one or more processors of the electronic gaming machine to, through execution of the gaming platform application, not assign a first display window of the plurality of display windows to any of the wagering game applications and to control the first display window to have a z-order that places the first display window in front of one of the display windows assigned to a wagering game application of the one or more wagering game applications.

In some implementations, the method may further include controlling the one or more processors to cause the gaming platform application to: a) monitor the one or more second processes of each executing wagering game application, b) determine whether an instance of a first executing wagering game application of the one or more wagering game applications has become non-responsive or unexpectedly terminated based on (a), c) cause, responsive to (b), a new instance of the first wagering game application to be executed as another one or more second processes separate from the one or more first processes, d) assign a display window such as i) the display window assigned to the instance of the first executing wagering game application or ii) a newly created display window to the new instance of the first wagering game, and e) provide, to the new instance of the first wagering game, the window handle for the display window assigned to the new instance of the first wagering game.

In some implementations, a computer-readable, non-transitory medium may be provided that stores one or more computer-executable instructions for controlling one or more processors of an electronic gaming machine having one or more display devices. The computer-executable instructions stored on the computer-readable, non-transitory medium may be configured to, when executed by the one or more processors, control the one or more processors to cause: an operating system for the electronic gaming machine to be executed, a gaming platform application to be executed as one or more first processes in the operating system, the gaming platform application to cause a plurality of display windows to be instantiated on the one or more display devices, each display window having a corresponding window handle, the gaming platform application to obtain the window handle for each display window instantiated by the gaming platform application, one or more wagering game applications to be executed as one or more respective second processes in the operating system, where each second process is separate from the first process, the gaming platform application to assign a display window to each wagering game application of the one or more wagering game applications and to provide each wagering game application with the window handle associated with each display window assigned thereto, and each wagering game application to output graphical content for a wagering game to the display window associated therewith using the corresponding window handle.

In some implementations of the computer-readable, non-transitory medium, the computer-readable, non-transitory medium may further store additional computer-executable instructions that are configured to, when executed by the one or more processors, control the one or more processors to cause the gaming platform application to manage one or more of size, location, z-order, and transparency of each display window of the plurality of display windows while each wagering game application is outputting graphical content.

In some implementations of the computer-readable, non-transitory medium, the computer-readable, non-transitory medium may further store additional computer-executable instructions that are configured to, when executed by the one or more processors, control the one or more processors to cause each wagering game application to provide game event messages to the gaming platform application indicative of wagering game events in the wagering game provided by that wagering game application and to cause the gaming platform application to manage one or more of size, location, z-order, and transparency of each of the plurality of the display windows based on the wagering game events.

In some implementations of the computer-readable, non-transitory medium, the one or more wagering games may be a plurality of wagering games, and the computer-readable, non-transitory medium may further store additional computer-executable instructions that are configured to, when executed by the one or more processors, control the one or more processors to cause the gaming platform application to identify a first wagering game application of the plurality of wagering game applications that has provided a first game event message of the game event messages and indicating that a winning outcome is to be displayed in the display window assigned to the first wagering game application and to cause one or more of the display windows to be modified in advance of the display of the winning outcome and responsive to receipt of the first game event message by performing one or more actions such as: (a) increasing the size of the display window assigned to the first wagering game application, (b) moving the display window assigned to the first wagering game application to a new location on the one or more displays, (c) causing a display window of the plurality of display windows that is not assigned to one of the wagering game applications to display graphical content in a region that surrounds the display window assigned to the first wagering game application, (d) causing the display window assigned to the first wagering game application to cyclically expand and contract in size, and/or (e) causing one or more display windows of the plurality of display windows that are not assigned to the wagering game applications to display a semi-transparent, uniform color field over all of the display windows assigned to the wagering game applications except for the display window assigned to the first wagering game application.

In some implementations of the computer-readable, non-transitory medium, the computer-readable, non-transitory medium may further store additional computer-executable instructions that are configured to, when executed by the one or more processors, control the one or more processors to cause the gaming platform application to output first graphical content on a first display window of the display windows, where the first display window is not assigned to any of the one or more wagering game applications.

In some implementations of the computer-readable, non-transitory medium, the first graphical content may be (a) a graphical user interface configured to allow a player to select a wagering game for play on the electronic gaming machine from a plurality of wagering games for selection, (b) a graphical user interface for presenting multimedia content offered by an operator of the electronic gaming machine, (c) a graphical user interface for communicating with one or more users of other electronic gaming machines, (d) a graphical user interface for accessing administrative options for the electronic gaming machine, or (e) a graphical user interface for accessing audit functionality offered by the electronic gaming machine.

In some implementations of the computer-readable, non-transitory medium, the computer-readable, non-transitory medium may further store additional computer-executable instructions that are configured to, when executed by the one or more processors, control the one or more processors to cause the gaming platform application to output the first graphical content on the first display window while the first display window overlaps with and is on top of at least one or more of the one or more display windows assigned to the one or more wagering game applications.

In some implementations of the computer-readable, non-transitory medium, the computer-readable, non-transitory medium may further store additional computer-executable instructions that are configured to, when executed by the one or more processors, control the one or more processors to cause each wagering game application to provide game event messages to the gaming platform application indicative of wagering game events in the wagering game provided by that wagering game application and to cause the gaming platform application to, responsive to receipt of one or more of the game event messages, cause data representing the graphical content of at least the display window assigned to the wagering game application that originated the one or more game event messages to be saved on the one or more memory devices.

In some implementations of the computer-readable, non-transitory medium, the computer-readable, non-transitory medium may further store additional computer-executable instructions that are configured to, when executed by the one or more processors, control the one or more processors to not assign a first display window of the plurality of display windows to any of the wagering game applications, and to control the first display window to have a z-order that places the first display window in front of one of the display windows assigned to a wagering game application of the one or more wagering game applications.

In some implementations of the computer-readable, non-transitory medium, the computer-readable, non-transitory medium may further store additional computer-executable instructions that are configured to, when executed by the one or more processors, control the one or more processors to: a) monitor the one or more second processes of each executing wagering game application, b) determine whether an instance of a first executing wagering game application of the one or more wagering game applications has become non-responsive or unexpectedly terminated based on (a), c) cause, responsive to (b), a new instance of the first wagering game application to be executed as another one or more second processes separate from the one or more first processes, d) assign a display window such as i) the display window assigned to the instance of the first executing wagering game application or ii) a newly created display window to the new instance of the first wagering game, or e) provide, to the new instance of the first wagering game, the window handle for the display window assigned to the new instance of the first wagering game.

The implementations shown in the Figures are merely representative examples and are to be understood to not limit the scope of this disclosure.

DETAILED DESCRIPTION

Figure 1:
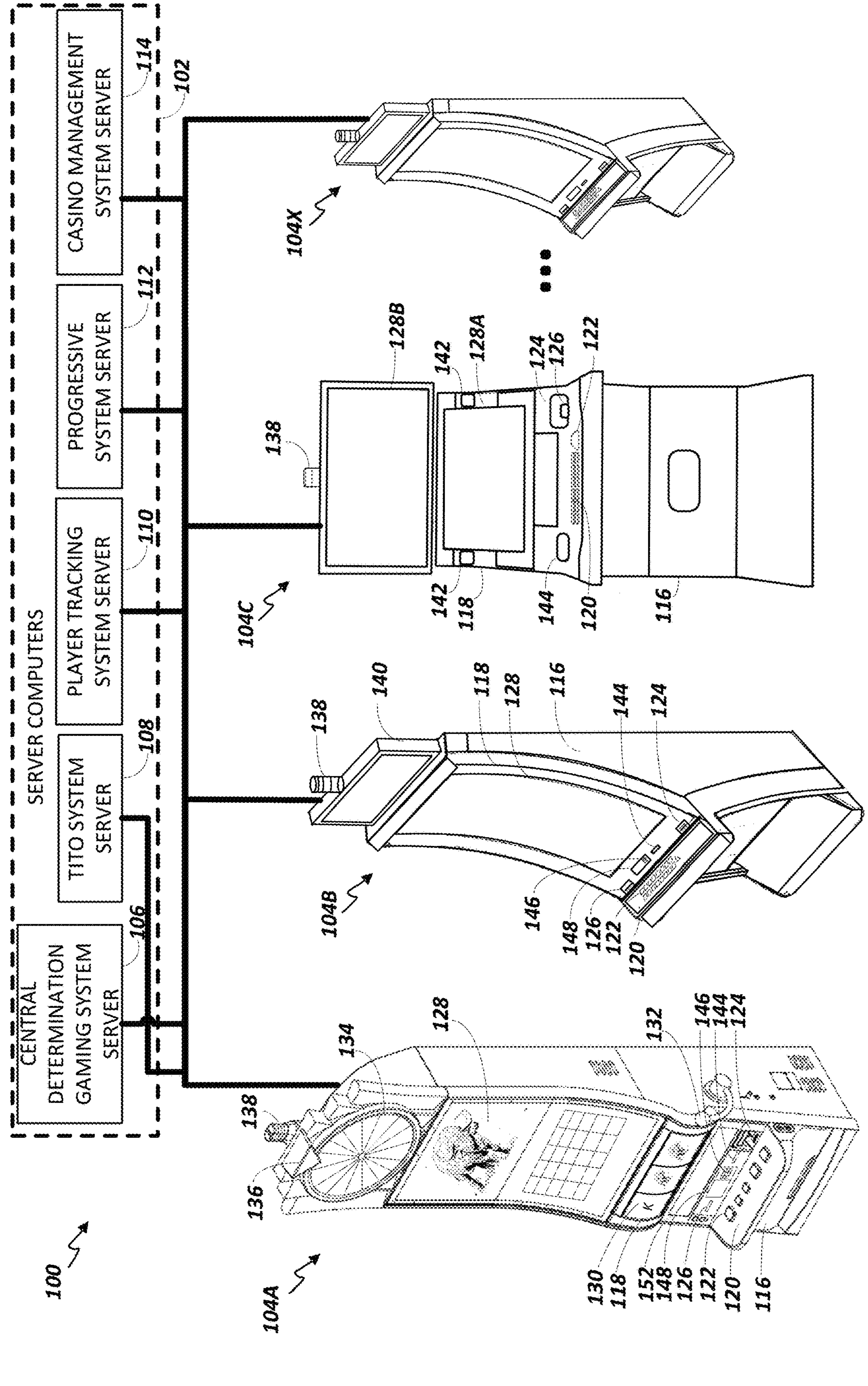
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
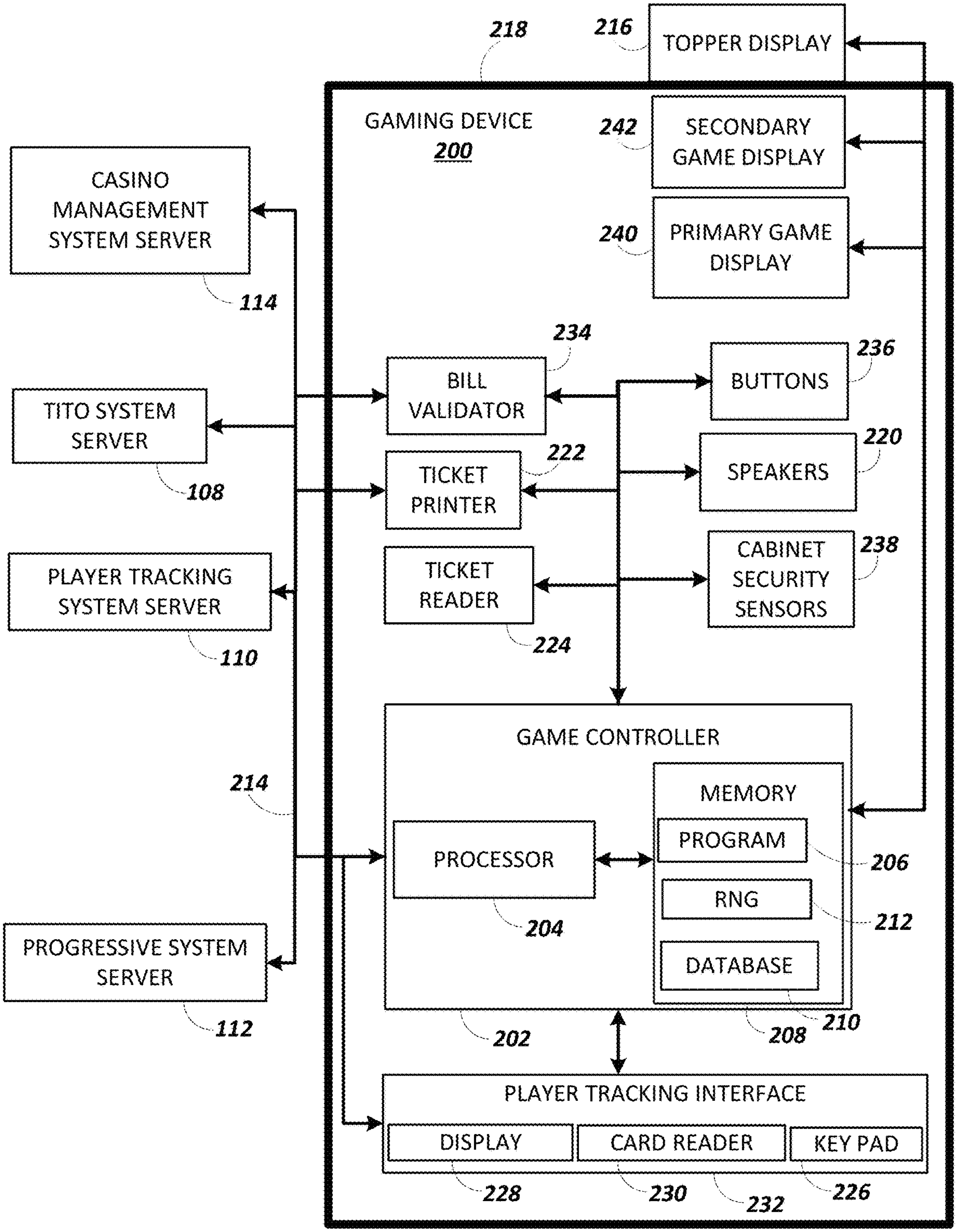
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM, mass storage memory, such as a hard-drive or optical drive, or another form of storage media that stores instructions for execution by the processor 204. Note that embodiments of the present disclosure represent an improvement in the art of EGM software and provide new technology in that they provide a more robust architecture for offering electronic gaming machines having process-independent gaming platform applications and wagering game applications. As discussed above, such architectures allow for wagering game applications to be decoupled from the gaming platform applications from a process perspective, which significantly reduces or eliminates the chances that an unhandled error in a wagering game application that causes a crash will cause the gaming platform application to also crash. Such architectures also allow for the gaming platform application to initiate a wagering game application restart if such a premature termination of a wagering game application is detected, and also allow for centralized management of display windows for the wagering game applications by the gaming platform application. Such features may facilitate providing multiple wagering games for play on an electronic gaming machine simultaneously and may enhance the reliability of the electronic gaming machine and reduce the amount of downtime/frequency of reboots needed during normal use. These embodiments are thus not merely new game rules or simply a new display pattern.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for reading or writing data to a magnetic or optical-strip card or to a smart card, a transceiver for wired or wireless communication to and from a portable device such as a smart phone or tablet computer. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

As discussed earlier herein, the architectures provided in this disclosure are implemented such that a gaming platform application is provided on an electronic gaming machine that is executable as one or more first processes on the electronic gaming machine, and such that one or more wagering game applications are provided on the electronic gaming machine that are executable as one or more second processes that are separate from the one or more first processes.

A gaming platform application, as the term is used herein, refers to one or more programs that, in aggregate, provide a platform or framework for managing peripherals of an electronic gaming machine and for managing execution of one or more wagering game applications. Generally speaking, a gaming platform application is executed prior to the execution of any wagering game application and provides a framework that manages the various peripherals that may be implemented in the electronic gaming machine and provides other software that may be executed on the electronic gaming machine with information relating to those peripherals. For example, an electronic gaming machine may include platform-level functionality relating to display devices, player input devices (including physical buttons as well as touch-screen overlays), card readers (for reading player loyalty cards, credit cards, promotional cards, etc.), cameras, speakers, lighting systems, movable elements of the electronic gaming machine (for example, some electronic gaming machines may have actuators that cause various elements of the electronic gaming machine to move during use, e.g., to cause a separate display panel to rise up out of the top of the electronic gaming machine to display a bonus game), wireless communications devices (for example, a near-field communications (NFC) or radio frequency identification (RFID) reader that may be used to scan an NFC or RFID tag associated with a particular player), and so forth. All of these peripherals may be managed by the gaming platform application, which may, in turn, provide an application programming interface (API) that allows other programs, e.g., wagering game applications, to request data from, or send data to, one or more such peripherals.

Gaming platform applications are generally distinct from the operating system of an electronic gaming machine. The operating system of an electronic gaming machine, as the term is used herein, refers to one or more programs that, in aggregate, provide a framework for providing basic functionality in the electronic gaming machine. Examples of such operating systems include Linux or Microsoft Windows 10. Operating systems may thus provide basic input/output functionality, networking capability, disk storage access, memory management, and CPU/process management. During electronic gaming machine start-up, the electronic gaming machine may generally first initiate one or more bootloader programs that load increasingly complex and more fully-featured software, eventually culminating in the execution of an operating system kernel that manages the interface between software applications that may be executed by the operating system and the data processing capabilities of the one or more processors that are running the operating system. After the operating system kernel is executing, the electronic gaming machine may then proceed to load and execute the software for the gaming platform application, which may interface with the various peripherals included in the electronic gaming machine and which may then initiate the execution of one or more wagering game applications.

When an operating system executes an instance of a software application, it creates a "process" that represents that executing instance of the software application. The process includes a collection of information stored in memory, including, for example, the machine code associated with the program, input and output data, memory used by the instance, call stacks, and so forth. Once a process has been established by the operating system for a given instance of a software application, the operating system will prevent other processes from making use of the resources, e.g., memory, allocated to the established process.

In the Windows operating systems, for example, an overview of current processes may generally be found in the Windows Task Manager application under the "Processes" tab; each process in this view is given an "image name" that corresponds with the file name of the application executable, as well as an indication of how much memory is currently being used by each process (there are many columns of data that may be displayed in the Windows Task Manager process tab, including CPU usage, various summaries of memory usage/allocation, the number of threads within each process, etc.). While various processes may communicate with one another, e.g., send data to one another, the termination of a process does not necessarily cause the termination of the functionality of any other processes. In contrast, if a single process provides two or more different functionalities, an unhandled error associated with one functionality offered by that process would cause the process to not only not provide the functionality with the unhandled error, but would also cause it to not provide the other functionality or functionalities.

As discussed earlier herein, a gaming platform application may cause one or more wagering game applications to be executed by the electronic gaming machine as separate processes. A wagering game application, as the term is used herein, refers to one or more programs that, in aggregate, provide a wagering game for play on a gaming machine. Generally speaking, a wagering game application will include an executable that executes code from one or more files stored in non-volatile memory or storage on the gaming machine; such code includes instructions to produce and display graphical, video, and/or audio content for providing a wagering game. The code may also include instructions for interfacing with a gaming platform application in order to obtain player inputs/selections and random numbers from various electronic gaming machine peripherals for use in determining wagering game outcomes and/or wagers for the wagering game; the code may also include instructions for interfacing with the gaming platform application to obtain or provide information relating to, or modifying, the credit balance tracked by the gaming platform application. In some of the implementations discussed herein, multiple instances of a particular wagering game application may be caused to be executed by the gaming platform application; each such instance would be assigned its own process, separate from the processes assigned to the other instances thereof and separate from the process or processes for the gaming platform application.

Figure 3:
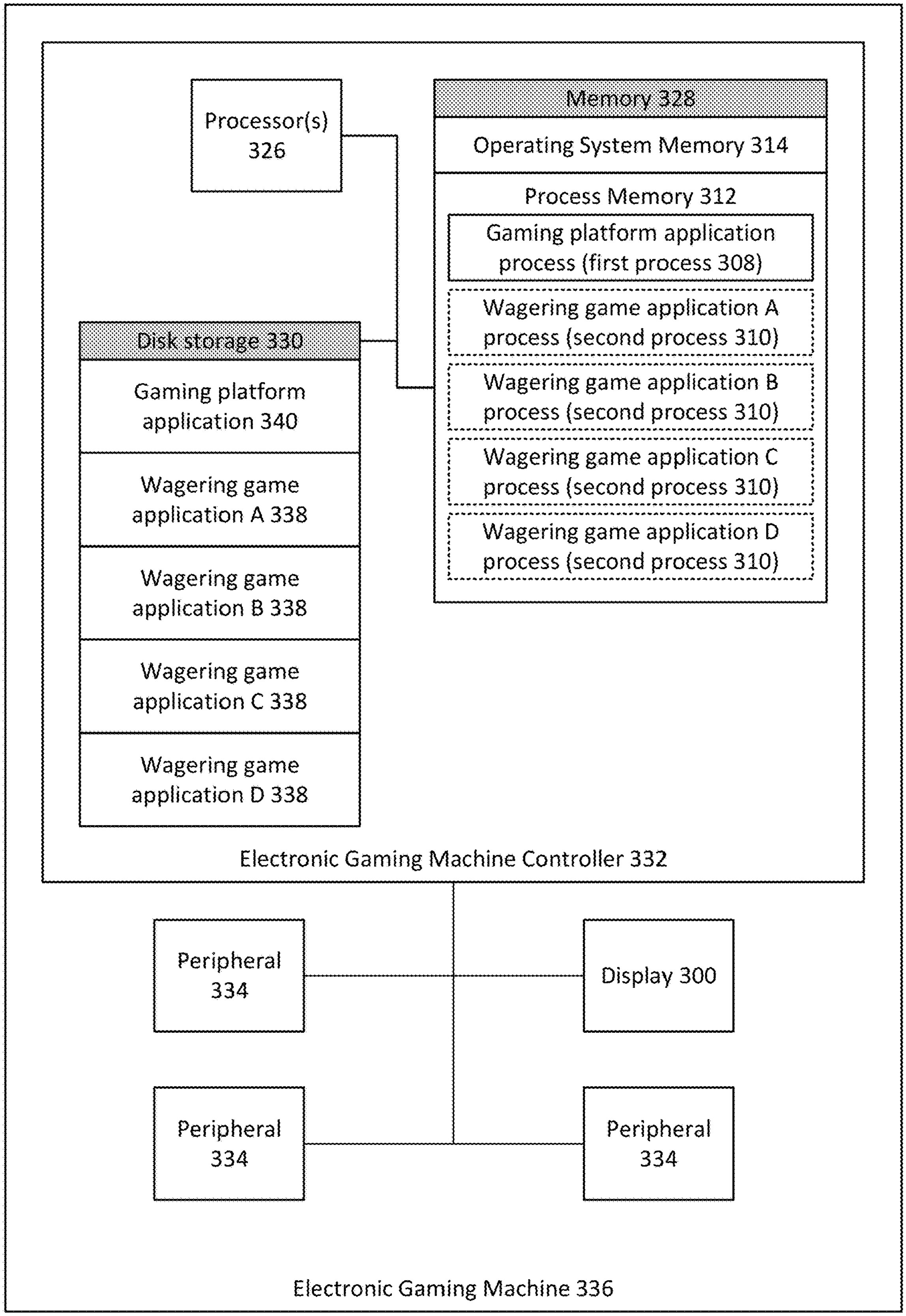
FIG. 3 depicts a schematic of an example electronic gaming machine implementing an architecture such as is disclosed herein.

FIG. 3 depicts a schematic of an example electronic gaming machine implementing such an architecture. In FIG. 3, an electronic gaming machine 336 is provided that includes a gaming controller 332 that may be operatively connected with a display 300 and several peripherals 334, e.g., credit card readers, loyalty card readers, random number generators, etc. The gaming controller 332 may include one or more processors 326, non-volatile storage 330, e.g., hard disk storage, flash memory storage, solid state storage, or the like, and memory 328, e.g., random access memory (RAM). The non-volatile storage 330 may store files for various wagering game software applications 338, as well as one or more files for a gaming platform application 340. During operation, the one or more processors 326 may cause an operating system to be loaded into an operating system memory 314 portion of the memory 328 and executed, after which the one or more processors may cause the gaming platform application to be executed as a first process 308 in a process memory 312 portion of the memory 328. Subsequent to this, the one or more processors 326 may be caused to load one or more wagering game applications, e.g., wagering game applications A-D, into memory and then cause each such wagering game application to be executed as one or more second processes 310. To be clear, both memory 328 and non-volatile storage 330 may be thought of as different types of "memory devices."

Figure 4:
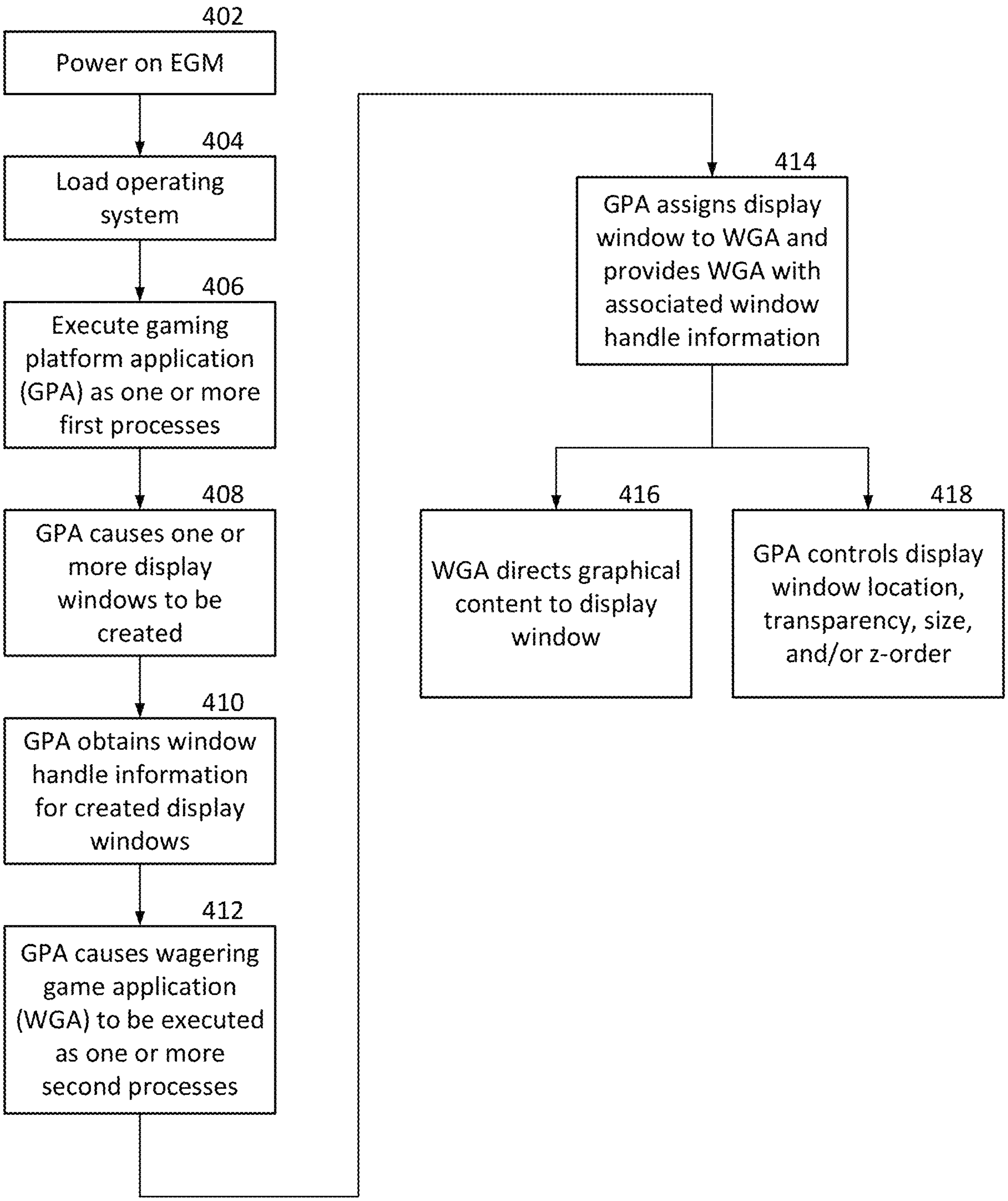
FIG. 4 depicts a flowchart of one technique for providing such an architecture.

FIG. 4 depicts a flowchart of one technique for providing such an architecture. In block 402, an electronic gaming machine (EGM) configured to implement such an architecture may be powered on or reset, which may cause one or more bootloaders associated with the EGM to load the operating system of the EGM into memory and initiate execution of the operating system kernel in block 404. In block 406, a gaming platform application (GPA) may be loaded into memory and executed by one or more processors of the EGM as one or more first processes; the GPA may then cause, in block 408, one or more display windows to be created. In block 410, the GPA may obtain window handle information for each of the created display windows (in some implementations, the GPA may simultaneously cause the one or more display windows to be created and obtain the window handle information for each display window in the same action, e.g., by instructing a window manager to create a display window having a predetermined window handle). In block 412, the GPA may cause one or more wagering game applications (WGAs) to be executed by the one or more processors; each WGA may be executed by the one or more processors as one or more second processes separate from the one or more first processes. The GPA may then, in block 414, assign a display window to each WGA and provide that WGA with the window handle information associated with that display window (it will be understood that the GPAs discussed herein may also, in some instances, assign multiple display windows to a particular WGA, each with its own window handle and/or, in some instances, assign a single display window to multiple WGAs; for ease of discussion, the discussion below generally assumes a 1:1 assignment of display windows to wagering game applications).

Once a wagering game application has been assigned a display window and provided with the window handle therefor, the wagering game application may direct graphical content to the assigned display window using the associated window handle in block 416. At the same time, the gaming platform application may control at least the size, location, transparency, and z-order of that assigned display window in block 418. Various further implementations based on this paradigm are discussed in more detail below.

As noted earlier, the gaming platform application may, prior to (or in conjunction with) causing one or more wagering game applications to be executed, cause one or more display windows to be generated for displaying graphical content. A display window, as the term is used herein, refers to a uniquely identifiable graphical control element in which graphical content can be displayed by a program. Display windows are generally created by a window manager, which is a program, typically part of an operating system, that manages the creation, position, visibility, size, z-order (which refers to the ordering of various display windows when placed in an overlapping configuration), and transparency of, as well as content displayed in, display windows in a graphical user interface on a computing system. A software application that wishes to display graphical content would typically initiate a communication to a window manager requesting that the display window be created by the window manager for the software application; the window manager would then create the requested display window and provide the requesting software application with a "window handle," which may be a unique identifier or object name that may identify the associated display window. The software application may then send further requests, each in association with the display handle, to the window manager, e.g., via an application programming interface (API) to modify the display window in one or more ways, e.g., to adjust the size, position, z-order (which refers to the ordering of various display windows when placed in an overlapping configuration), transparency, etc., or to write graphical content to the display window; the window manager may then, based on the provided window handle, route such commands to the appropriate display window or otherwise cause the appropriate display window to be modified as instructed by the software application.

Generally speaking, in most contexts in which display windows are used, control over display window content and formatting is retained by the software application, i.e., process, that requested the display window, although the window manager may often allow the operating system itself to retain some limited ability to modify aspects of the formatting of the display window, e.g., to allow a user to move a display window using a mouse, minimize or maximize a display window, or change the z-order of the display window. In particular, in some implementations, display windows may be created that are considered "children" of other display windows, e.g., display windows that may be located within the bounds of other display windows ("container" display windows) and may be anchored to those other display windows so that when a display window that contains other display windows is moved, the display windows contained therein may move in tandem therewith. In such implementations, the application that caused the child display windows to be created may be given complete control over the positioning of those child display windows relative to the container display window that contains them, e.g., in at least some implementations, the operating system may be unable to modify such positioning (or any other properties specific to the child display windows). It will be understood that for the implementations discussed herein, some implementations may utilize a GPA that creates a container display window and then creates multiple child windows within the container display window that may be used in the manner discussed herein, e.g., some such child display window may be assigned to WGAs to allow graphical content for wagering game applications to be output therein, while other child display windows may be reserved for use by the GPA. It will also be understood, however, that similar implementations may be used in which such child display windows are not used, e.g., where each display window may be separately positioned completely independently of the other display windows.

As discussed earlier, the gaming platform applications disclosed herein may assign a particular display window to a particular wagering game application that is executing in one or more processes separate from the one or more processes that provide the gaming platform application and may then communicate information identifying the window handle for that particular display window to wagering game application to which it is assigned. The wagering game application may then, by providing instructions to the window manager in association with the window handle, cause graphical content to be written to the display window "owned" by the gaming platform application. Thus, two separate applications, both executing in separate processes in the electronic gaming machine operating system, are both able to access a common display window and cause content to be displayed therein and/or modify the formatting of such a display window.

In various implementations, the gaming platform application may be configured to control at least the placement, size, z-order, and transparency of the display windows that it generates, and the wagering game applications may be configured to control the content that is displayed in the display windows which have been assigned to them by the gaming platform application and for which they have been provided the associated window handles by the gaming platform application. Thus, wagering game content is controlled by the wagering game application, whereas wagering game presentation, e.g., where the display window for the wagering game is located, how big the display window is, how transparent the display window is, what the z-order of the display window is, etc., is controlled by the gaming platform application.

Such architecture allows for increased flexibility in wagering game presentation. For example, in electronic gaming machines implementing such architectures, a player may be afforded the opportunity to select up to some number, e.g., four, wagering games for simultaneous or generally simultaneous play. The gaming platform application may provide, for example, a "lobby" GUI that allows a player to scroll through available wagering games and to select one or more of them for play. Such a GUI may, for example, be presented via a display window that is instantiated by the gaming platform application but which is not, and will not, be assigned to a wagering game application. Such a display window is thus "dedicated" to the gaming platform application and may be used to present interfaces or information that are generally independent of the operation of any particular wagering game application being executed concurrently therewith.

Figure 5:
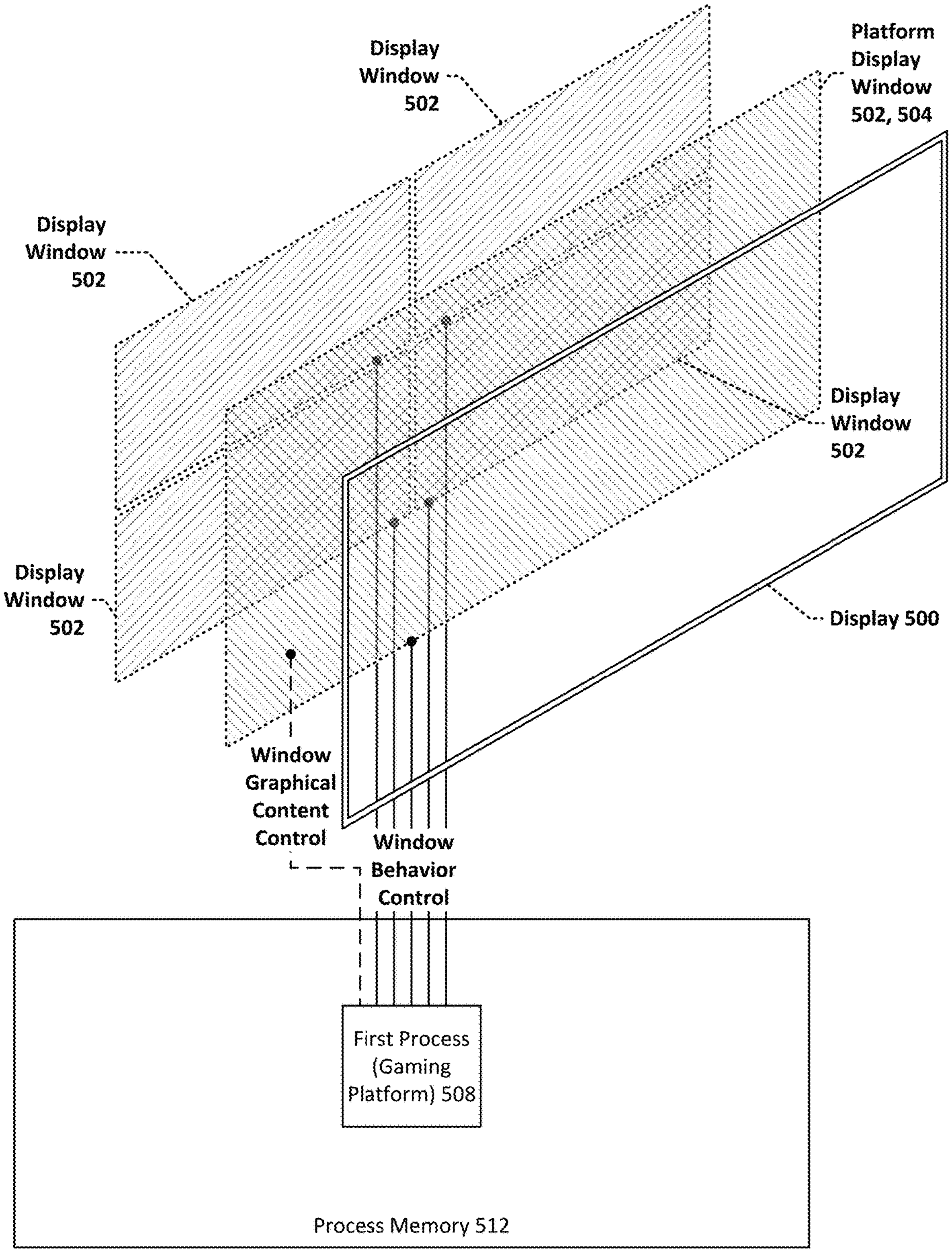
FIG. 5 depicts an example schematic representation of an implementation in which a first process has caused five display windows to be instantiated.

FIG. 5 depicts an example schematic of an implementation in which a first process 508, i.e., a gaming platform application process executing in process memory 512, has caused five display windows 502 to be instantiated, e.g., by requesting the creation of such display windows 502 from a window manager provided by the operating system. The display windows 502 represent graphical control elements displayed on a display 500; to facilitate discussion, the display windows 502 and the display 500 are depicted as being "exploded," physically separate items, but in reality, the display windows 502, of course, would be data constructs that are used to provide graphical output on the display 500. It will be understood that the display 500 may, in some implementations, be augmented by additional displays, and that a display window 502 may span between multiple displays in such implementations.

The first process 508 has, as discussed earlier, been provided with information describing a window handle for each display window 502 and has controlled the display windows 502 via such window handles (such window behavior control is represented figuratively as the solid vertical lines extending from the first process 508 to the bottom edges of each display window 502) so that the five display windows 502 are arranged in a particular arrangement, e.g., with four of the display windows 502, which may be intended to be assigned to executing wagering games at a later time and which may also be referred to as wagering game display windows 506 (such a callout has been used in later Figures where such display windows 502 have actually been assigned to particular wagering game applications), arranged in a side-by-side, two-by-two configuration; each such display window 502, in this example, has been controlled so as to have a size that is ~¼ of the overall area of the display 500. The four "rear" display windows 502 may thus each occupy a discrete and non-overlapping region of the display 500. At this point, no wagering game application is executing yet, and none of these display windows 502 are being controlled to provide graphical content, although, in some implementations, the gaming platform application itself may cause graphical content to be output by sending graphical content to such display windows 502 using the window handles therefor.

The fifth display window 502, which may also be referred to herein as a platform display window 504, has been sized to occupy the entire viewable area of the display 500 and thus completely overlaps each of the wagering game display windows 506. It will be understood that the gaming platform application may not necessarily always size platform display windows to occupy the entire display area of the display 500 in some implementations. Furthermore, the platform display window 504 and the other display windows 502 have been controlled by the first process 508 to have a relative z-ordering where the platform display window 504 is "closer" to viewer of the display 500 than the four display windows 502, i.e., the platform display window 504 is in "front" of the other four display windows 502. The gaming platform application can, using the appropriate window handles and display window commands, cause the various display windows to move, resize, change their z-order, and/or change their transparency. For example, the gaming platform application may cause the platform display window 504 to become completely transparent, move to a location beyond the display area of the display 500, or change its z-order so that it is "behind" all of the other display windows 506, thereby effectively hiding it from view and permitting unobstructed viewing of the other four display windows 502. Similarly, the gaming platform application may also cause the platform display window 504 to become partially or entirely opaque, move to the location depicted, or change its z-order such that it is in the location depicted, thereby causing the graphical content displayed therein to overlap with, and at least partially obscure, the graphical content (if any) provided by the other display windows 502.

Figure 6:
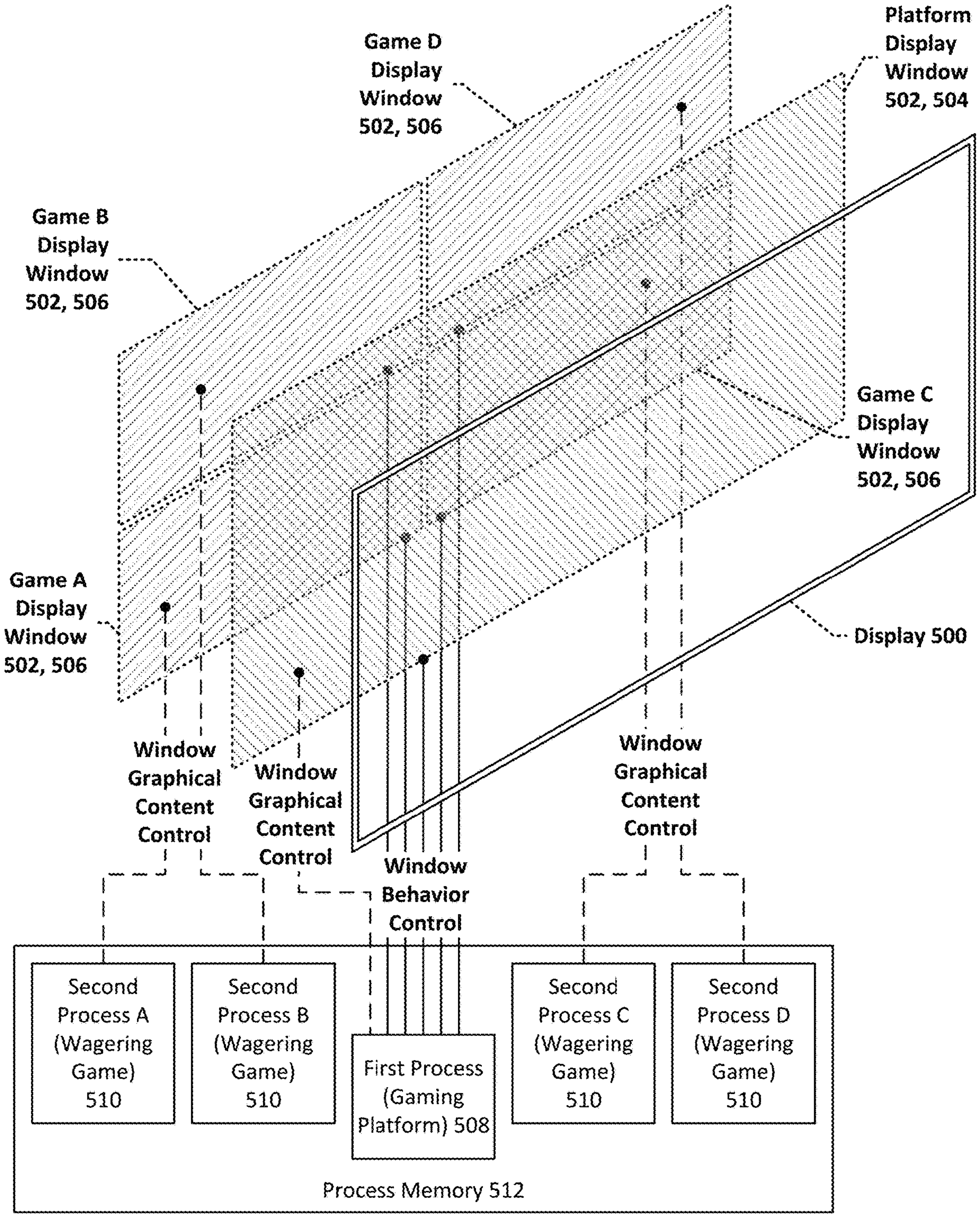
FIG. 6 depicts the schematic representation of FIG. 5 but with four instances of wagering game applications executing.

In FIG. 6, four instances of wagering game applications have been caused to be executed as separate second processes 510 by the first process 508. The gaming platform application has also assigned each of the wagering game applications a different one of the four smaller display windows 502, which may also be identified as wagering game display windows 506 herein, and has provided each of the wagering game applications with the window handle corresponding to the wagering game display window 506 assigned thereto, thereby allowing the second process 510 for each wagering game application to direct graphical content to the wagering game display window 506 assigned thereto, as figuratively indicated by the dashed "window graphical content control" lines connecting each second process with the interior of a respective wagering game display window 506.

Figure 7:
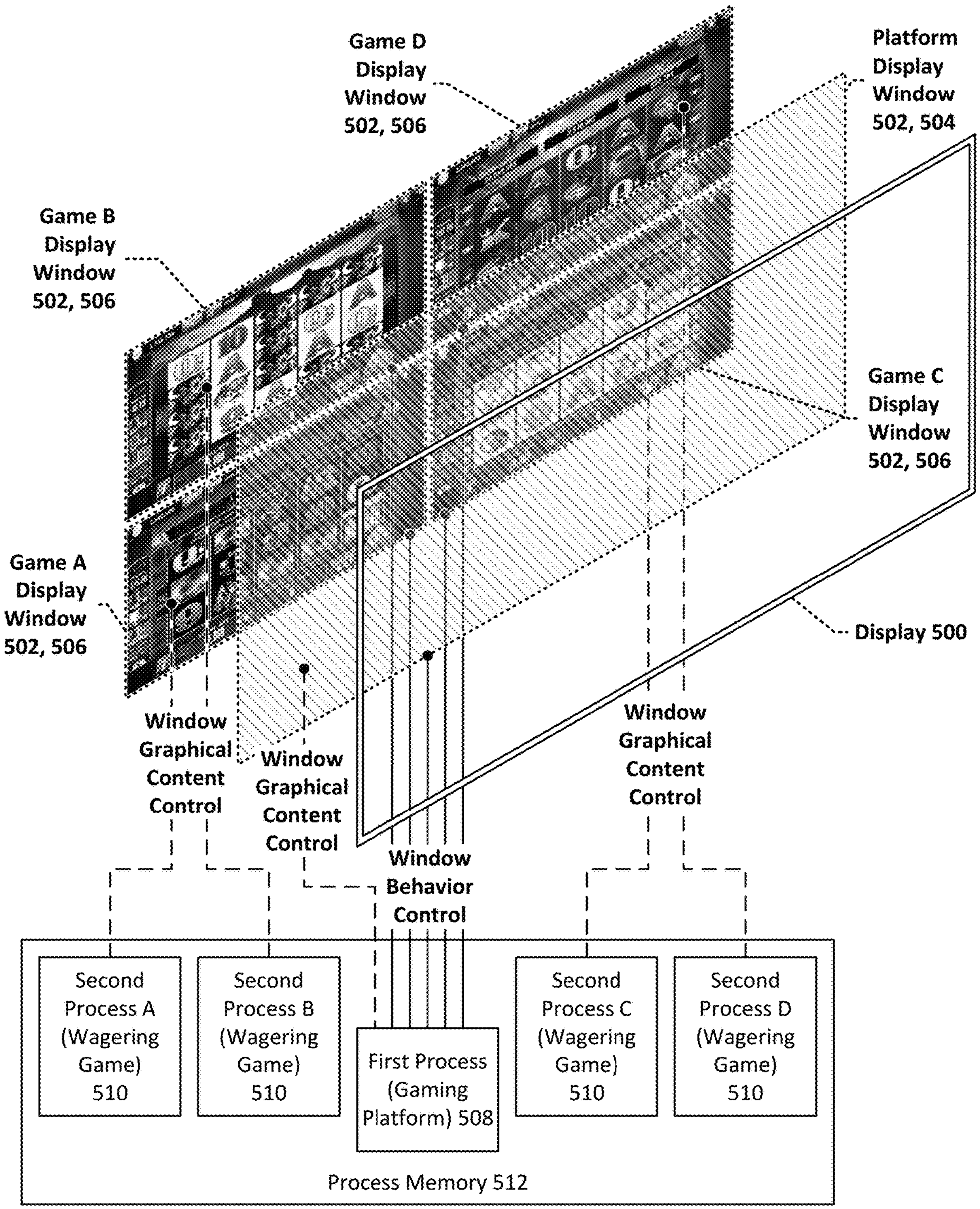
FIG. 7 depicts the schematic representation of FIG. 6, but with graphical content from the four wagering game applications being provided.

In FIG. 7, the four wagering game applications executing as the second processes 510 have each caused respective graphical content to be displayed in their assigned wagering game display windows 506. As can be seen, each wagering game application's graphical content is for a different wagering game, highlighting the fact that an electronic gaming machine implementing the architecture described herein may be capable of flexibly providing a large number of different wagering games for play and allowing a player a large degree of control and customization with respect to their individual gaming experience. The diagonal semi-transparent hatching pattern depicted in the platform display window 504 in these Figures (as well as in the display windows 502 shown in other Figures) is provided merely to assist in discerning the various display windows; in practice, the platform display window 504 may be caused to become transparent or otherwise rendered non-obscuring with respect to the wagering game display windows 506 during presentation of the wagering game application graphical content.

Figure 8:
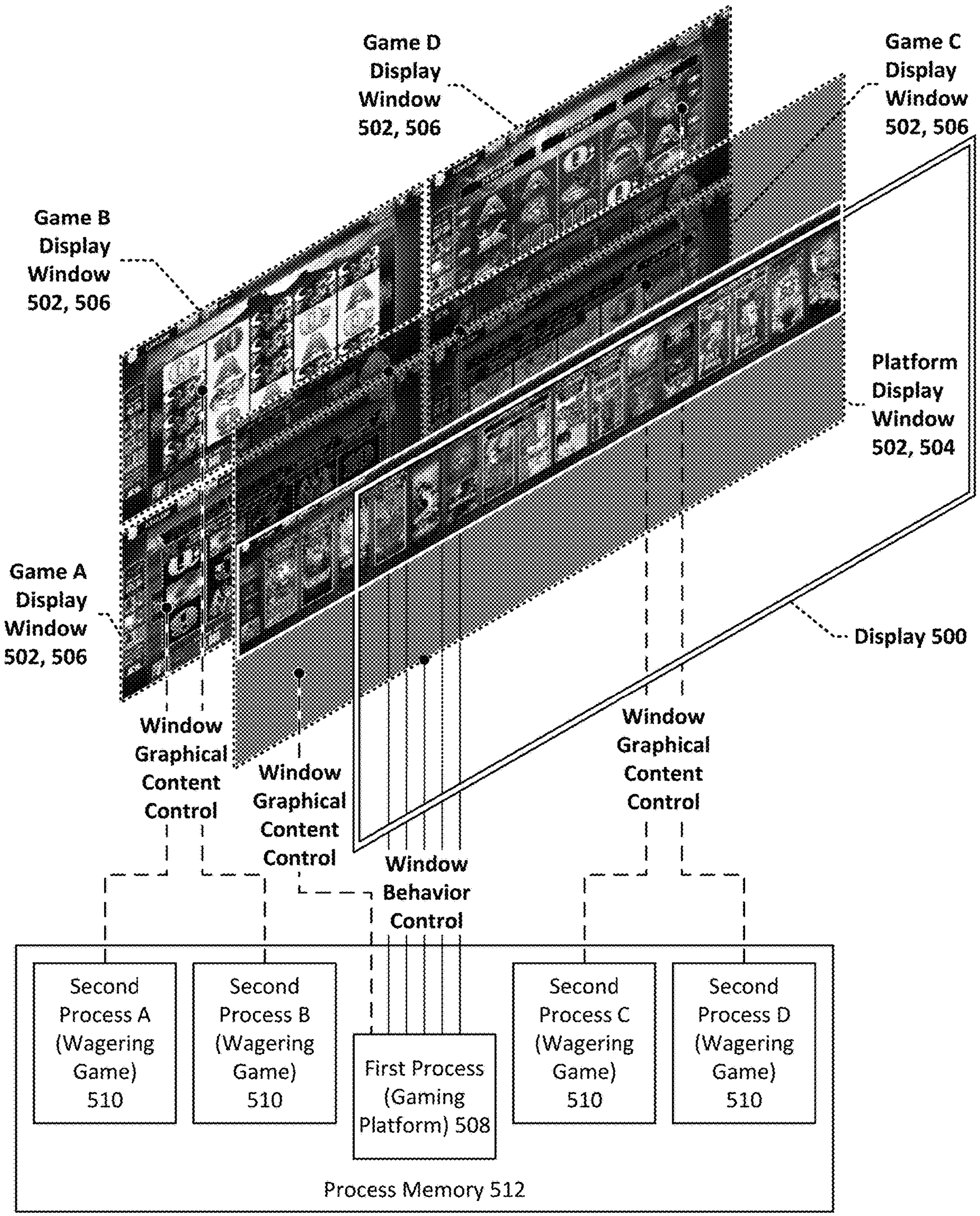
FIG. 8 depicts the schematic representation of FIG. 6 with a display of a wagering game selection GUI overlaid on the display windows showing wagering game content.

In FIG. 8, the gaming platform application has caused the platform display window 504 to become semi-transparent and display a wagering game selection GUI featuring a large number of potential wagering games that may be selected by the player for play. Such a GUI may, for example, be caused to be displayed by the gaming platform application responsive to one or more communications received by the gaming platform application from one of the wagering game applications. For example, each wagering game application may have a user-selectable option to "change game" that may be selected using a touch-screen control located within the wagering game display window assigned to that wagering game application; responsive to such a selection, the wagering game application may send a message to the gaming platform application, e.g., via an API provided by the gaming platform application, to indicate that the player wishes to select a new wagering game for play in the wagering game display window for that wagering game application. The gaming platform application may then, responsive to such a message, cause the game selection GUI to be displayed in the platform display window 504 as discussed above. In some implementations, the gaming platform application may, responsive to receiving the message, send messages to each of the wagering game applications, e.g., via respective APIs for such wagering game applications, to cause the wagering game applications to enter a "pause" state so that the player does not need to worry about missing a game play event or game outcome for the wagering game applications while the game selection GUI is displayed. A similar "resume" command may be provided to each wagering game application once a menu selection has been made and the game selection GUI hidden or closed. The wagering game application that was assigned to the wagering game display window in which the "change game" option was selected may then be caused to shut down, and an instance of the newly selected wagering game application may be caused to execute as another one or more second processes and may be assigned to that wagering game display window and provided the window handle therefor.

As noted above, the wagering game applications and the gaming platform application may each have respective APIs (or other communications interfaces) that may be used to send data, messages, or commands between the wagering game applications and the gaming platform application. Such communications interfaces may be used, for example, to communicate wagering game application events to the gaming platform application to allow the gaming platform to, for example, manipulate the wagering game display windows for a plurality of the wagering games or to manipulate the platform display window to cause a particular wagering game display window to be emphasized. For example, each wagering game application may, among other things, send messages to the gaming platform application indicating when a particular type of wagering game outcome is about to be achieved.

For example, a wagering game application may, upon the push of a "spin" button in the wagering game application, send a message to the gaming platform application requesting a random number. The gaming platform application may, responsive to such a request, generate a random number using, for example a random number generator or pseudo-random number generator of the electronic gaming machine, and may then send a further message back to the wagering game application with the random number. The wagering game application, on receiving the random number message, may then determine a game outcome for the wagering game according to outcome determination rules for the wagering game. From the player's perspective, this process may occur more or less instantaneously-however, the wagering game application may then control the wagering game graphical content to display one or more animations representing, for example, spinning reels, bonus games, etc. that may be controlled so as to provide a graphical result, e.g., combination of reel symbols or bonus game outcome, that aligns with the determined outcome. Such animations and other graphical content output may take several seconds to resolve, for example.

In some electronic gaming machines utilizing the disclosed architecture, the wagering game applications may cause a message to be sent back to the gaming platform application when a particular random number supplied by the gaming platform application results in a particular outcome. In other such implementations, the outcome determined according to each random number supplied to the wagering game application may be reported out to the gaming platform application before the graphical content reflecting such an outcome is finished being presented (usually, such reporting may occur generally as soon as the outcome is known to the wagering game application). In either case, the outcome information provided to the gaming platform application may be evaluated by the gaming platform application to determine if the wagering game application is in the process of presenting a significant winning outcome, e.g., a winning outcome higher than a predetermined amount, a winning outcome higher than other winning outcomes of the other wagering game applications, a winning outcome higher than other winning outcomes of the other wagering game applications by a predefined amount, a winning outcome higher than other winning outcomes of the other wagering game applications by a predefined multiple or percentage, a winning outcome that results in a jackpot award, etc.

If the gaming platform application determines that a particular wagering game application is in the process of presenting graphical content reflecting such a significant winning outcome, the gaming platform application may cause the wagering game display windows (or the platform display window) to be manipulated such that the wagering game display window of the wagering game application in which the significant winning outcome is occurring is emphasized in some manner.

Figure 9:
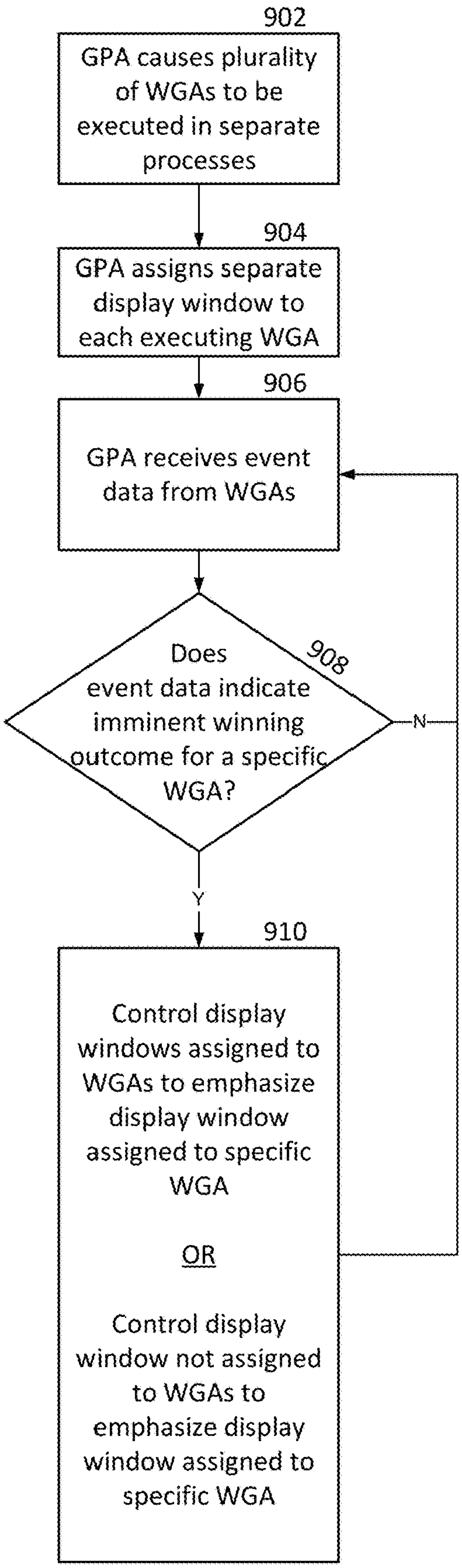
FIG. 9 depicts a flow chart of an example technique for emphasizing a display window for a particular wagering game application.

FIG. 9 depicts a flow chart of such a technique. In block 902, a gaming platform application may cause a plurality of wagering game applications to be executed as separate processes (both from each other and from whatever process or processes are executing to provide the gaming platform application). The gaming platform application may then assign a display window to each executing wagering game application and provide that wagering game application with a window handle therefor in block 904.

In block 906, the gaming platform application may receive event data, e.g., via an API or other interface, from each wagering game application as such events occur. Such event data may include indications of what game outcomes (or, in many cases, what type of game outcome—big win, jackpot win, bonus win, etc.) have been determined for and/or are being presented or will be presented in the display window assigned to each wagering game. In block 908, such event data may be evaluated by the gaming platform application to determine if the event data represents, for example, an imminent presentation of a winning outcome (or even a recent, already presented winning outcome). If the event data indicates an imminent presentation of a (or very recently presented) winning outcome for a particular wagering game application, the gaming platform application may optionally determine if the winning outcome is of sufficient importance, e.g., monetary amount, to warrant special emphasis of the display window assigned to that wagering game application. If the gaming platform application determines that no special emphasis is appropriate, the technique may return to block 906 for further monitoring of event data from the wagering game applications. If the gaming platform application instead determines that a winning outcome of sufficient importance to warrant special emphasis of the display window presenting such an outcome is imminent (or has very recently been presented), then the technique may proceed to block 910 before returning to block 906 for further event data monitoring.

Figure 10:
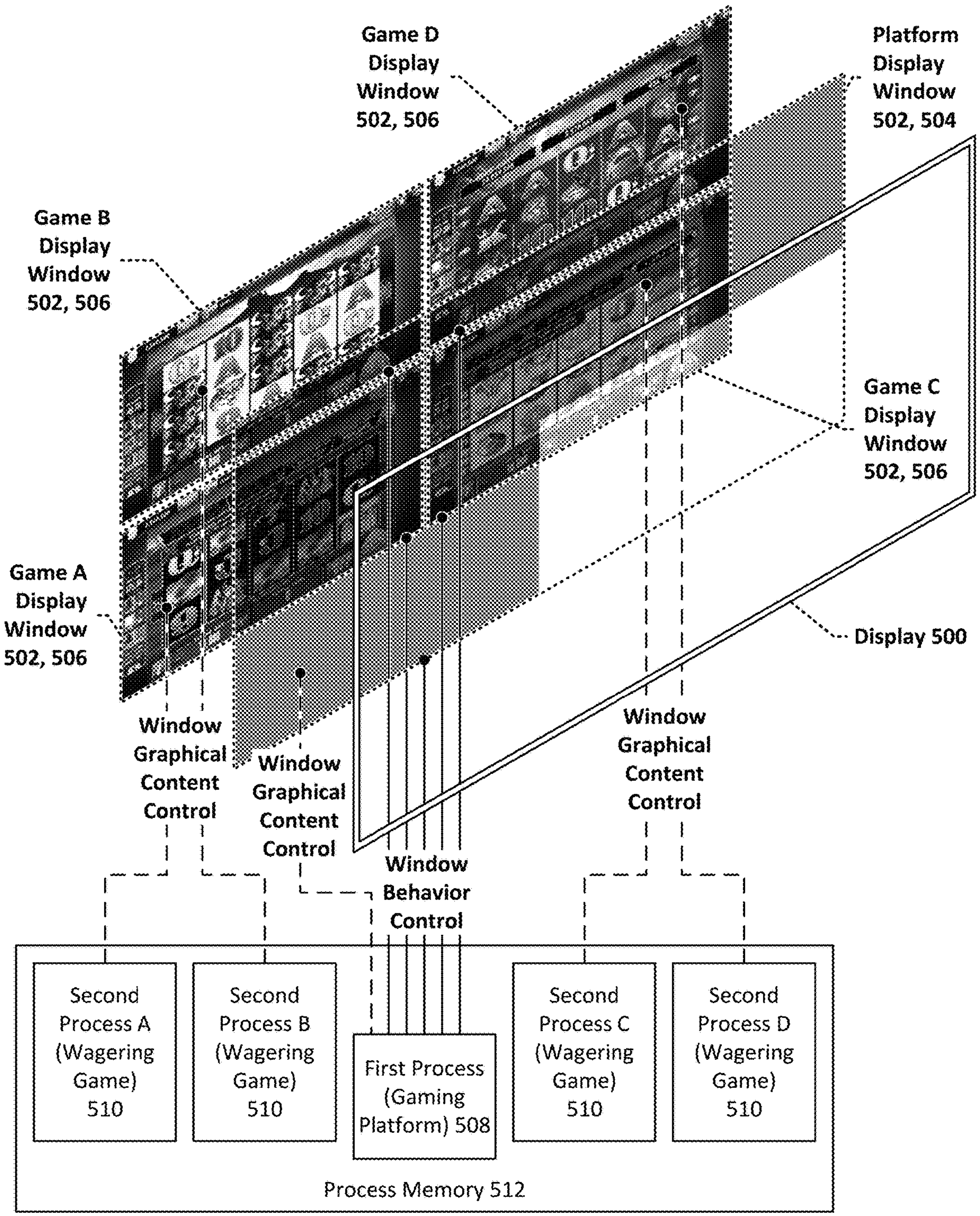
FIGS. 10 through 12 depict various examples of how a gaming platform application may emphasize a display window assigned to a particular wagering game application.
Figure 11:
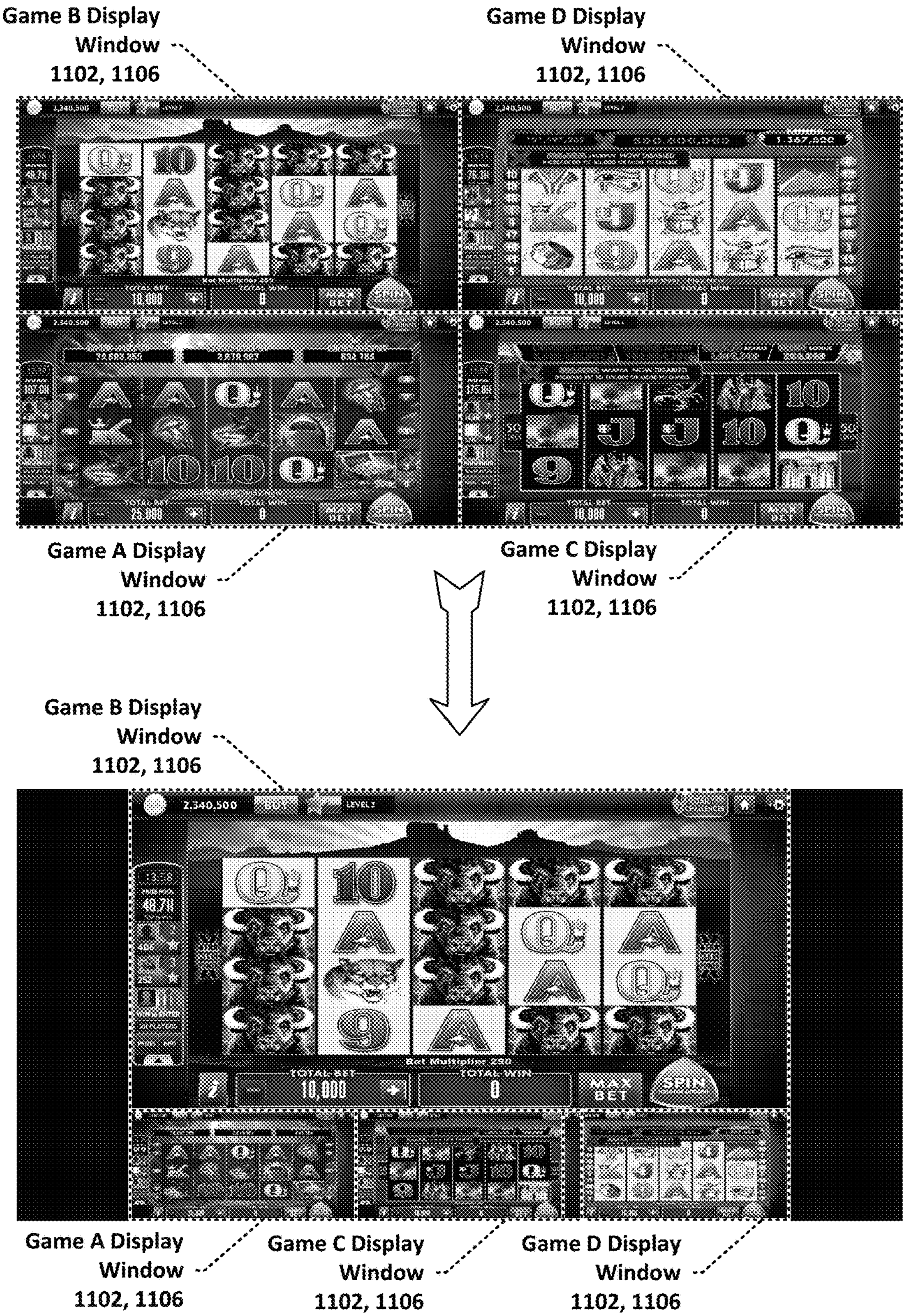
Figure 12:
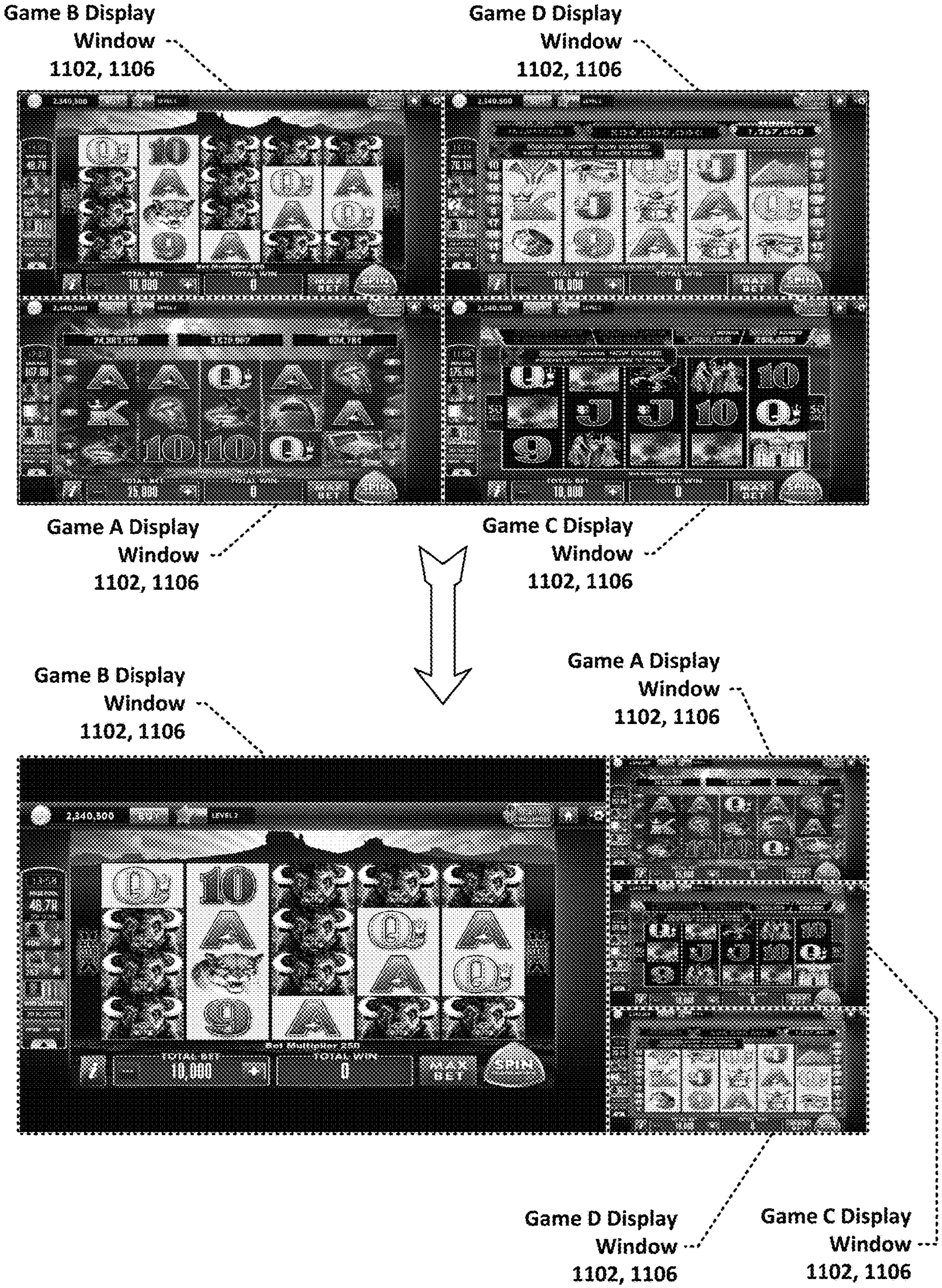

In block 910, the gaming platform application may control the size, position, z-order, and/or transparence of the display windows assigned to the wagering game applications to cause the display window for the wagering game application with the outcome of interest to be emphasized. Alternatively or additionally, the gaming platform application may control, for example, a platform display window (a display window not assigned to a wagering game application) to display graphical content that emphasizes the wagering game display window of interest. FIGS. 10 through 12 depict various examples of how a gaming platform application may emphasize a display window assigned to a particular wagering game application.

For example, in some implementations, the gaming platform application may, using the window handle for the platform display window 504, cause the platform display window 504 to become semi-transparent, e.g., 50% transparent, and, if not already positioned or sized in such a way, be positioned such that it extends over all of, and is positioned in front of, the wagering game display windows 506. The gaming platform application may also, again using the window handle for the platform display window 504, cause the platform display window 506 to display content such as what is displayed in FIG. 10, e.g., a uniform black or grey color field across the entire platform display window 506 except in the rectangular portion thereof that overlays the wagering game display window 506 that is to be emphasized. In this example, the wagering game display window to be emphasized is the lower right display window 502. This has the effect of emphasizing the wagering game display window 506 that will shortly present a significant winning game outcome by causing the other wagering game display windows 506 to "dim" while still remaining visible so that the player does not feel like the emphasis of the wagering game display window is interfering with their ability to monitor the outcomes in the remaining wagering game display windows should they so desire. The wagering game display window that is to be emphasized, in the interim, may remain at its normal brightness and thus contrast more sharply with the "dimmed" wagering game display windows.

In some implementations, the gaming platform engine may cause the transparency of the platform display window 504 to gradually be adjusted so as to cause the non-emphasized wagering game display windows to slowly fade to a dimmer state; after the winning wagering game event presentation is concluded, the gaming platform engine may cause the platform display window to return to a state of complete transparency, move to a location off-screen, move behind the wagering game display windows 506, or otherwise be updated so that the platform display window no longer modifies the appearance of the wagering game display windows.

In another example, the gaming platform engine may cause the platform display window 504 to generate graphical content in the immediate vicinity around the perimeter of the wagering game display window 506 to be emphasized, but may constrain such graphical content such that it does not extend to an undesirable extent into, or overlap with, the graphical content displayed in the other wagering game display windows. For example, the gaming platform application may cause graphical content depicting a border of flames, a glowing aura, or other graphical embellishment around the "border" of the display window to be emphasized to be depicted on the platform display window; the remainder of the graphical content displayed on the platform display window 504 may consist of transparent or semi-transparent pixels so that the graphical content displayed in the other wagering game display windows 506 is not obscured or altered (other than the content that might be overlapped by the graphical embellishment discussed above).

In some implementations, an electronic gaming machine such as those discussed above may include a gaming platform application that is configured to emphasize a wagering game display window by modifying the size and position of the wagering game display windows, e.g., by increasing the size of the wagering game display window to be emphasized and decreasing the size of the wagering game display windows that are not being emphasized. FIGS. 11 and 12 depict two examples of such display window manipulation. In FIG. 11, the wagering game display window in the upper left corner has been identified by the gaming platform application as being about to display a significant winning event. The gaming platform application may then cause the upper left wagering game display window to increase in size, e.g., by approximately 50%, and for the other three wagering game display windows shown to decrease in size, e.g., by about 50%. The gaming platform application may also cause the wagering game display windows to be rearranged such that the wagering game display window to be emphasized is, for example, positioned above the other wagering game display windows and such that the other wagering game display windows are arranged in a single line below the wagering game display window to be emphasized.

FIG. 12 depicts a similar window sizing/rearrangement that some gaming platform applications may use to emphasize a particular wagering game display window. In this implementation, however, the wagering game display window to be emphasized has been positioned to the left of the other wagering game display windows and increased in size, and the other wagering game display windows have been reduced in size and positioned in a single column to the right of the wagering game display window to be emphasized.

Various other techniques may be used by a gaming platform application to emphasize a particular wagering game display window. For example, in some implementations, the gaming platform application may cause the wagering game display window to be emphasized to have a Z-order that is closer to the viewer than the other wagering game display windows and to then cause that wagering game display window to, for example, "shake" or "pulse." During "shaking," the wagering game display window to be emphasized may be caused by the gaming platform application to undergo multiple small, rapid movements in various directions, e.g., displacements of less than 5% or 10% of the maximum dimension of that wagering game display window. Such small displacements may allow the graphical content that is displayed in the wagering game display window being "shaken" to still generally be discernible to the player and may also generally prevent the "shaking" wagering game display window from obscuring the key graphical content, e.g., reels, shown in the other wagering game display windows. Similarly, during "pulsing," the gaming platform application may cause the wagering game display window to be emphasized to generally remain stationary but repeatedly expand in size, e.g., by 5% to 10%, and then contract to its original size. Such "pulsing" or "shaking" may be caused to occur by the wagering game application, in some implementations, until the significant winning event or outcome presentation is completed or may, in some other implementations, be caused to occur for a predefined interval, e.g., 2 seconds, 3 seconds, etc.

It will be understood that, in some implementations, there may be multiple platform display windows that are controlled by the gaming platform application. For example, the gaming platform application may control a first platform display window that may have a z-order that is controlled such that it is generally always "in front" of the wagering game display windows and a second platform display window that is also controlled by the gaming platform application.

The first platform display window may be controlled by the gaming platform application to display graphical content depicting a very limited GUI, e.g., perhaps consisting only of a few user-selectable controls to adjust global volume settings, call for waitstaff, bring up a casino map, find or chat with friends via a player tracking interface, etc. Such controls may, for example, be located along the bottom or peripheral edges of the overall display such that they generally do not interfere with the wagering game graphical content that is displayed in the wagering game display windows. In some implementations, the first platform display window may extend beyond the limits of the wagering game display windows, and the GUI elements shown in the first platform display window may be located in the portion(s) of the first platform display window that do not overlap with the wagering game display windows at all. The remainder of the graphical content that the platform gaming application causes to be displayed on the first platform display window, e.g., the non-GUI graphical content that would overlap with most or all of the graphical content displayed on the wagering game display windows, may generally consist of blank or transparent pixels so that the graphical content displayed in the first platform display window does not mask or obscure the graphical content provided on the wagering game display windows located "behind" the first platform display window. Thus, the first platform display window may be used by the gaming platform application to display a persistent and consistent GUI that allows access to platform-level user options while allowing for any combination or permutation of wagering game content to be displayed in the wagering game display windows that are present.

The second platform display window may, for example, be controlled by the gaming platform application in a manner similar to that described earlier, e.g., its overall transparency may be adjusted and a uniform color field, e.g., of black, displayed such that the transparency setting of the second platform display window causes the display windows located "behind" it to be dimmed or brightened. If the gaming platform application controls the second platform display window to have a z-order in between that of the first platform display window and that of the wagering game display windows, this allows the second platform display window to modify the brightness of one or more of the wagering game display windows, e.g., to emphasize an outcome presentation in a particular wagering game display window, without also affecting the display of the GUI in the first platform display window. A similar technique may be used, for example, when displaying a different GUI in the first platform display window, e.g., a game selection GUI, such as discussed earlier.

Some implementations of gaming platform applications may also be configured to provide additional content via platform display windows, e.g., other than just menus and/or user-selectable options. For example, in some implementations, a gaming platform application may include chat functionality—either through text-based chats or through video chat. In such implementations, the gaming platform application may provide graphical content reflecting text-based chats, video chat, or both to a display window. Such a chat-related display window may, for example, be a platform display window. In other implementations, such additional functionality may be provided by another application that executes as yet another process that is separate from the gaming platform application process and the wagering game application processes, and the gaming platform application may assign a display window, and provide a window handle therefor, to that other application to allow the other application to write graphical content to the assigned display window. In some implementations, other types of graphical content-providing applications may be handled in a similar manner by the gaming platform application. For example, the gaming platform application may assign a display window to a video player application (which may stream video content from a remote server, e.g., live television, live sports coverage, news, entertainment, movies, television shows, advertising, etc.) or to an application that provides advertising content (either video or still image); such an application may then output graphical content that is displayed in the display window.

In some such implementations, the gaming platform application may be configured to permit the display windows assigned to such supplemental content-providing applications to be positioned in a way that may at least partially obscure a wagering game display window. For example, in some implementations, the gaming platform application may allow the player to define the size and position of such display windows, e.g., through inputs provided via a touchscreen, for example. In some additional or alternative implementations, the gaming platform application may also manage the size and position of the display windows assigned to such supplemental content-providing applications so as to reposition, hide, or change the transparency of the display windows so that critical wagering game events displayed on any of the wagering game display windows are not obscured. For example, when multiple wagering games are being presented on an electronic gaming machine display, it may often be the case that only a subset of those wagering games is experiencing an active gaming event, i.e., displaying graphical content initiated by a player pressing a "spin" button or the like and that culminates in a predetermined game outcome being displayed. In such situations, the gaming platform application, which may receive status messages from the wagering game applications indicating various current states of wagering game play, may identify a region of the display where there are no wagering game display windows presenting content for active gaming events and may then re-position the display window assigned to the supplemental content-providing application to be located within such a region, thus potentially obscuring or partially obscuring a wagering game display window that is not presenting content for an active gaming event, which may avoid situations where presentation of an active gaming event is obscured by such a display window. In other implementations, the gaming platform application may simply “hide” such display windows completely, e.g., by making them completely transparent, relocating them to locations outside of the display area of the display, or changing the z-order so that they are located behind the wagering game display windows, during presentation of active gaming events. In yet other implementations, a display window assigned to a supplemental content-providing application may have a relatively large aspect ratio, e.g., be long and thin, and may be controlled by the gaming platform application to be positioned along one edge of a display while other display windows assigned to wagering game applications may be controlled by the gaming platform applications to be positioned in other regions of the display that do not overlap with the display window assigned to the supplemental content-providing application. In some implementations, the supplemental content-providing application may be hidden or otherwise not available during play (as discussed above) but may be invoked or summoned by a player during play by pressing a button or making a menu selection; in such cases, the gaming platform application may cause the various display windows assigned to wagering game applications to be resized to be smaller in footprint and repositioned to present a more compact overall footprint, and may then cause the display window or windows assigned to the supplemental content-providing application to be positioned in the regions of the display formerly occupied by the resized and repositioned display windows assigned to the wagering game applications. If the supplemental content-providing application is then later caused to be hidden or terminated, the display windows assigned to the wagering game applications may be caused to be returned to their previous positions and sizes, thereby occupying the screen real estate previously occupied by the display window or windows assigned to the supplemental content-providing application. It will be understood that supplemental content-providing applications may be separate applications from the gaming platform application in some implementations, whereas in other implementations, the supplemental content-providing application functionality may be provided directly by the gaming platform application itself (thus, the gaming platform application and the supplemental content-providing application may be one and the same).

In particular, some implementations according to the concepts discussed herein may include gaming platform applications that are configured to provide, or to cause other applications to be executed to provide supplemental content such as a “service window” or “media window” in one or more of the display windows. In such implementations, the display window displaying such service window or media window content may be an Aristocrat Technologies nCompass™ Media Window or Content Window. In such implementations, the supplemental content that is displayed in such display windows may include content related to promotions (such as promotions at the venue where the gaming machine may be located), announcements, upcoming events, available bonuses, menus and ordering interfaces for refreshments, controls for summoning a concierge or waitperson, etc.

It will be further appreciated that the electronic gaming machine architecture discussed herein may allow for enhanced auditing capabilities as well. Electronic gaming machines are often required to store game outcome information for later reference in case there is a dispute about a particular game outcome; in some instances, such information may include screenshots of what is displayed on the display. Some implementations of gaming platform applications may be configured to monitor game event messages generated by wagering game applications to identify particular instances in time when each wagering game application is presenting a game outcome. The gaming platform application may then send, responsive thereto and using the window handle for the display window assigned to that wagering game application, instructions to the display window assigned to that wagering game application requesting screenshot data for the graphical content being displayed in that display window. The gaming platform application may then store such screenshot data for future reference, generally in association with further information such as the type of wagering game application which generated the graphical content, the time of the screenshot, etc. Since the screenshot data may be obtained directly from the display window via the window handle, such screenshot data may only include the graphical content associated with that display window and not, for example, additional graphical content in other display windows that may have overlaid that display window at the time the screenshot data was obtained. This may allow for unobstructed capture of wagering game outcome graphical content, regardless of whether other display windows obscure or partially obscure such content from view of the player.

It will be appreciated that electronic gaming machines implementing architectures such as are described herein may allow for a large amount of user-customization, including allowing users to select which wagering game applications will be provided for play. In view of this, it will be understood various implementations of gaming platform applications may include configuration GUIs that permit a player to select between different potential arrangements of wagering game display windows, e.g., one or more of a single wagering game display window (similar to what would be output on a traditional single-game electronic gaming machine), a 1×2 or 2×1 array of wagering game display windows, a 2×2 array of wagering game display windows (similar to those depicted in many of the Figures), a 2×3 or 3×2 array of wagering game display windows, a 3×3 array of wagering game display windows, a 3×4 or 4×3 array of wagering game display windows, a 4×4 array of wagering game display windows, and so forth. From a practical perspective, arrangements of larger numbers of display windows are certainly possible and are considered within the scope of this disclosure.

Figure 13:
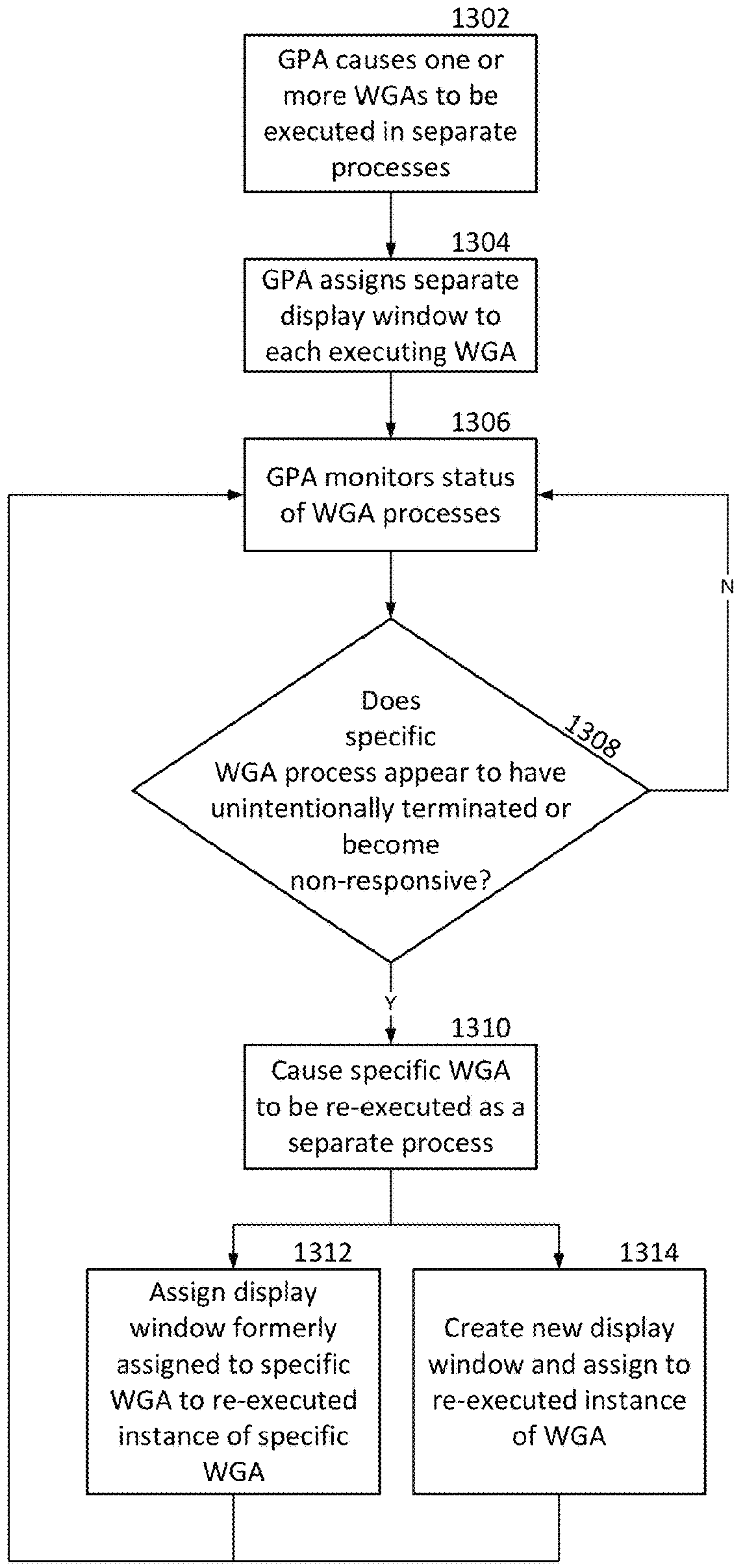
FIG. 13 depicts a flow chart of an example technique for crash-recovery functionality under various architectures disclosed herein.

As mentioned earlier herein, electronic gaming machine architectures that include a gaming platform application that is executed as one or more first processes that are separate from second processes used to provide for execution of wagering game applications may provide for more robust operation of electronic gaming machines, e.g., such electronic gaming machines may a) be more capable of continuing operation if a particular wagering game application experiences an unhandled error and b) may actually be able to re-execute such an abnormally terminated wagering game application in order to allow the player to resume play thereof with a minimum of interruption. FIG. 13 depicts a flow chart of an example technique for such crash-recovery functionality.

In block 1302, a gaming platform application may cause a plurality of wagering game applications to be executed as separate processes (both from each other and from whatever process or processes are executing to provide the gaming platform application). The gaming platform application may then assign a display window to each executing wagering game application and provide that wagering game application with a window handle therefor in block 1304.

In block 1306, the gaming platform application may periodically monitor or evaluate the status of the wagering game applications. Such monitoring or evaluating may occur through a number of ways. For example, there may be frequent communication, e.g., via APIs or other interfaces, between the gaming platform application and the wagering game application(s) executing on an electronic gaming machine operating using the architecture discussed herein. For example, wagering game applications may frequently send the gaming platform application random number generation requests, event updates, and other messages. If a wagering game application ceases to provide such communications, this may indicate that that wagering game application has stopped functioning.

Additionally, the gaming platform application may generally know which wagering game applications are currently executing as second processes (or should be) since the gaming platform application generally initiates the execution of the wagering game applications as second processes. Thus, the gaming platform application may periodically review all of the processes presently being executed and determine that a particular wagering game application that was executing has experienced a terminal fault if a second process(es) for that wagering game application that should be executing is no longer present.

Another technique that the platform gaming machine may use is to send a message to the wagering game application that would normally provoke a response message from the wagering game application; if such a message is sent and no response is provoked, then this may indicate that the wagering game application has become non-responsive.

In the event that the gaming platform application determines that a particular wagering game application has potentially become non-responsive, the gaming platform application may, in some implementations, perform additional checks to verify such non-responsiveness, e.g., by sending a message to the wagering game application to provoke a response.

In some instances, a wagering game application may fail in a way that leaves the second process or processes therefor running, e.g., a wagering game application may become trapped in an infinite loop that precludes it from providing wagering game functionality and also prevents it from responding to messages sent by the gaming platform application. In such instances, the gaming platform application may take additional steps if it determines that an executing process for a wagering game application has become non-responsive. For example, the gaming platform application may send one or more instructions to the operating system to cause the operating system to terminate the execution of the non-responsive process, thereby freeing up the memory occupied by that wagering game process and also preventing the non-responsive process from being able to provide graphical content to the display window assigned thereto.

During normal operation, the gaming platform application may manage the execution and termination of wagering game applications and may thus be able to identify scenarios where a terminated wagering game application process has experienced a controlled termination, e.g., responsive to an instruction to terminate execution sent from the gaming platform application process, or whether such termination was unexpected, e.g., without any instruction by the gaming platform application to do so or without any notification to the gaming platform application by the wagering game application that a controlled termination was being performed by the wagering game application.

In block 1308, the gaming platform application may determine if any of the wagering game applications have unintentionally terminated or otherwise become non-responsive. If it is determined in block 1308 that all wagering game applications that should be executing still appear to be executing as intended, then the technique may return to block 1306 for further monitoring of the wagering game application processes.

If it is determined in block 1308 that a particular wagering game application process has become non-responsive or has unintentionally terminated, then the gaming platform application may, in block 1310, cause that wagering game application to be re-executed as one or more second processes. Such re-execution may include causing the wagering game application to load the most recent game state data that is saved on the electronic gaming machine for that wagering game to place that wagering game in a state that is the same as, or as close as possible to, the state that the wagering game was in prior to becoming non-responsive or unexpectedly terminating.

The gaming platform application may, in block 1312, assign the same display window that was previously assigned to the abnormally terminated or non-responsive instance of that wagering game application to the newly executing instance of that wagering game application. Alternatively, the gaming platform application may, in block 1314, cause that display window for the abnormally terminated or non-responsive instance of the wagering game application to be terminated/destroyed, and may then cause a new display window to be generated in its place and assigned to the newly executing instance of the wagering game application. Regardless of which option is implemented, the gaming platform application may then provide the newly executing instance of the "recovered" wagering game with the relevant window handle for the newly assigned or reassigned display window.

The use of a gaming platform application-utilizing architecture such as is described herein allows for greater flexibility in controlling how lobby/interface content and wagering game application content is displayed. In addition to controlling the formatting and placement of display windows, the gaming platform application may also be configured to manage touch input in some implementations. For example, the gaming platform application may receive touch input information, e.g., from the operating system, relating to one or more of the display windows. The gaming platform application may evaluate such touch input information, determine which display window is associated therewith, and then take appropriate action. Such actions may include responding directly to the touch input, e.g., if the touch input is for a display window for which the gaming platform application provides graphical content, then the gaming platform application may interpret the touch input information and take appropriate action, or may include passing the touch input on to, for example, one or more processes for another application, e.g., a wagering game application, associated with a particular display window.

For example, if a set of display windows is arranged as shown in FIGS. 5-8, e.g., with four display windows (referred to as display windows 1-4 for the purposes of this discussion) used for displaying wagering game application content arranged in a 2×2 array and a fifth display window (referred to as display window 5 for the purposes of this discussion) for displaying gaming platform application content completely overlapping the 2×2 array, touch input that is provided may be intended by the user to be applied to either display window 5 or any one of the display windows 1-4, depending on the context of the input. For example, if display window 5 generally consists of a large “transparent” region that overlaps nearly all of the display windows 1-4 but which includes one or more small “opaque” regions that coincide with button controls located along the outer edge of display window 5, e.g., a “menu” or “lobby” button, a touch input that coincides with the transparent region would be intended to be applied to one of the display windows 1-4 underneath the touch input location.

In view of this, the gaming platform application may be configured to determine whether touch input information received by the gaming platform application coincides with a location within a display window that is “on top of” one or more other display windows and has graphical content controlled by the gaming platform application, e.g., a display window such as display window 5. If so, then the gaming platform application may determine whether the region of that display window, e.g., display window 5, that coincides with the touch input is intended to display graphical content provided by the gaming platform application or is intended to instead display graphical content from one of the display windows underneath that window, e.g., graphical content from any of display windows 1-4.

If the gaming platform application determines that the touch input coincides with graphical content provided by the gaming platform application, then the gaming platform application may, for example, do nothing with the touch input information or may, alternatively, perform one or more actions triggered by the touch input. For example, if touch input is received by the gaming platform application that coincides with a location, for example, in display window 5 that contains a “menu” or “lobby” button, then the gaming platform application may cause a menu or lobby interface to appear (either in display window 5 or, alternatively, in a new display window on top of display window 5). In contrast, if touch input is received by the gaming platform application in a location that does not coincide with graphical content provided by the gaming platform application (or that is formatted to allow the graphical content of a display window “underneath” that display window to be seen and interacted with therethrough), then the gaming platform application may, for example, pass on the touch input information to the application, e.g., wagering game application, that has been assigned to the topmost display window, e.g., one of display windows 1-4, that is underneath the display window assigned to the gaming platform application, e.g., display window 5.

The gaming platform application, when providing the touch input information to such an application, such as a wagering game application, may first reformat or transform the touch input information into a coordinate system that is defined relative to the display window assigned to that application. For example, if display window 5 is 2000×1000 pixels, and each of display windows 1-4 is 1000×500 pixels, a touch input received at coordinates (1523, 743) may be converted by the gaming platform application to coordinates (523, 243) before being provided to the wagering game application assigned to display window 4 (assuming that the (0,0) coordinates for display window 5 coincide with the upper left corner of the display and that display window 4 is located in the bottom left corner). This may allow the wagering game application to locate the touch input relative to graphical content provided by the wagering game application, e.g., buttons or controls of the wagering game application.

Architectures such as those discussed herein may be implemented, at least in part, using, for example, interfaces such as are provided by Microsoft DirectX Graphics Infrastructure (DXGI), which allows different processes to share access to a single display window (e.g., via a display buffer therefore).

It will be understood that the various techniques or operations discussed herein are not intended to suggest a particular order of operations unless an order of operations is inherent in the various stages of the techniques or operations discussed. For example, if a technique includes a first operation that produces a result that is required for a second operation to be performed, then the first operation would necessarily need to be performed prior to the second operation. However, if the first operation is merely shown earlier in a process diagram than the second operation, but there is no actual dependency between the first operation and the second operation, then it will be understood that, generally speaking, the first operation and the second operation may be performed in any order. Similarly, ordinal indicators, e.g., (a), (b), (c), etc., and arrows shown in the Figures used herein are used, unless otherwise indicated (either explicitly or inherently), to facilitate organization and for clarity; they are not intended to, and should not be understood to, necessarily convey a particular order or sequence of events. It will also be understood that the various operations discussed herein may be performed in manners other than as discussed.

It is to be understood that the phrases “for each <item> of the one or more <items>,” “each <item> of the one or more <items>,” or the like, if used herein, should be understood to be inclusive of both a single-item group and multiple-item groups, i.e., the phrase “for . . . each” is used in the sense that it is used in programming languages to refer to each item of whatever population of items is referenced. For example, if the population of items referenced is a single item, then “each” would refer to only that single item (despite the fact that dictionary definitions of “each” frequently define the term to refer to “every one of two or more things”) and would not imply that there must be at least two of those items.

While the invention has been described with respect to the Figures, it will be appreciated that many modifications and changes may be made by those skilled in the art without departing from the spirit of the invention. Any variation and derivation from the above description and Figures are included in the scope of the present invention as defined by the claims.

What is claimed is:

1. An electronic gaming machine comprising:

one or more display devices;

one or more processors; and one or more memory devices, wherein:

the one or more display devices, the one or more processors, and the one or more memory devices are operably connected, and the one or more memory devices store computer-executable instructions for controlling the one or more processors to cause:

an operating system for the electronic gaming machine to be executed;

a gaming platform application to be executed as one or more first processes in the operating system;

the gaming platform application to cause a plurality of display windows to be instantiated on the one or more display devices by a window manager of, or executed by, the operating system, each display window having a corresponding window handle;

the gaming platform application to obtain the window handle for each display window instantiated by the gaming platform application;

one or more wagering game applications to be executed as one or more respective second processes in the operating system, wherein the operating system allocates memory to each second process that is separate from memory allocated by the operating system to the one or more first processes and prevents each of the first and second processes from using the memory allocated to any of the other first and second processes;

the gaming platform application to assign a corresponding one of the display windows to each wagering game application of the one or more wagering game applications and to provide each wagering game application with the window handle associated with the display window assigned to that wagering game application; and each wagering game application to output graphical content for a wagering game to the display window associated therewith using the corresponding window handle.

2. The electronic gaming machine of claim 1, wherein the one or more memory devices further store computer-executable instructions for further controlling the one or more processors to:

a) monitor the one or more second processes of each executing wagering game application;

b) determine whether an instance of a first executing wagering game application of the one or more wagering game applications has become non-responsive or unexpectedly terminated based on (a);

c) cause, responsive to (b), a new instance of the first wagering game application to be executed as another one or more second processes separate from the one or more first processes;

d) assign a display window selected from the group consisting of: i) the display window assigned to the instance of the first executing wagering game application and ii) a newly created display window to the new instance of the first wagering game; and e) provide, to the new instance of the first wagering game, the window handle for the display window assigned to the new instance of the first wagering game.

3. The electronic gaming machine of claim 1, wherein the one or more memory devices further store computer-executable instructions for further controlling the one or more processors to cause:

each wagering game application to provide game event messages to the gaming platform application indicative of wagering game events in the wagering game provided by that wagering game application; and the gaming platform application to manage one or more of size, location, z-order, and transparency of each of the plurality of the display windows based on the wagering game events.

4. The electronic gaming machine of claim 3, wherein:

the one or more wagering games is a plurality of wagering games, and the one or more memory devices further store computer-executable instructions for further controlling the one or more processors to cause:

the gaming platform application to identify a first wagering game application of the plurality of wagering game applications that has provided a first game event message (i) of the game event messages and (ii) indicating that a winning outcome is to be displayed in the display window assigned to the first wagering game application; and cause one or more of the display windows to be modified in advance of the display of the winning outcome and responsive to receipt of the first game event message by performing one or more actions selected from the group consisting of: (a) increasing the size of the display window assigned to the first wagering game application, (b) moving the display window assigned to the first wagering game application to a new location on the one or more displays, (c) causing a display window of the plurality of display windows that is not assigned to one of the wagering game applications to display graphical content in a region that surrounds the display window assigned to the first wagering game application, (d) causing the display window assigned to the first wagering game application to cyclically expand and contract in size, and (e) causing one or more display windows of the plurality of display windows that are not assigned to the wagering game applications to display a semi-transparent, uniform color field over all of the display windows assigned to the wagering game applications except for the display window assigned to the first wagering game application.

5. The electronic gaming machine of claim 1, wherein:

the one or more memory devices further store computer-executable instructions for further controlling the one or more processors to cause the gaming platform application to output first graphical content on a first display window of the display windows, wherein the first display window is not assigned to any of the one or more wagering game applications, and the first graphical content is selected from the group consisting of: (a) a graphical user interface configured to allow a player to select a wagering game for play on the electronic gaming machine from a plurality of wagering games for selection, (b) a graphical user interface for presenting multimedia content offered by an operator of the electronic gaming machine, (c) a graphical user interface for communicating with one or more users of other electronic gaming machines, (d) a graphical user interface for accessing administrative options for the electronic gaming machine, and (e) a graphical user interface for accessing audit functionality offered by the electronic gaming machine.

6. The electronic gaming machine of claim 5, wherein the one or more memory devices further store computer-executable instructions for further controlling the one or more processors to cause the gaming platform application to output the first graphical content on the first display window while the first display window overlaps with and is on top of at least one or more of the one or more display windows assigned to the one or more wagering game applications.

7. The electronic gaming machine of claim 1, wherein the one or more memory devices further store computer-executable instructions for further controlling the one or more processors to:

not assign a first display window of the plurality of display windows to any of the wagering game applications, and control the first display window to have a z-order that places the first display window in front of one of the display windows assigned to a wagering game application of the one or more wagering game applications.

8. A method comprising:

causing one or more processors of an electronic gaming machine to execute an operating system for the electronic gaming machine;

causing the one or more processors of the electronic gaming machine to execute a gaming platform application as one or more first processes in the operating system;

causing the one or more processors of the electronic gaming machine to, through execution of the gaming platform application, cause a plurality of display windows to be instantiated on one or more display devices by a window manager of, or executed by, the operating system, each display window having a corresponding window handle;

causing the one or more processors of the electronic gaming machine to, through execution of the gaming platform application, obtain the window handle for each display window instantiated by the gaming platform application;

causing the one or more processors of the electronic gaming machine to execute one or more wagering game applications as one or more respective second processes in the operating system, wherein the operating system allocates memory to each second process that is separate from memory allocated by the operating system to the one or more first processes;

causing the one or more processors of the electronic gaming machine to, through execution of the gaming platform application, assign a corresponding one of the display windows to each wagering game application of the one or more wagering game applications and to provide each wagering game application with the window handle associated with the display window assigned to that wagering game application; and causing the one or more processors of the electronic gaming machine to cause each wagering game application to output graphical content for a wagering game to the display window associated therewith using the corresponding window handle.

9. The method of claim 8, further comprising causing the one or more processors of the electronic gaming machine to, through execution of the gaming platform application:

a) monitor the one or more second processes of each executing wagering game application;

b) determine whether an instance of a first executing wagering game application of the one or more wagering game applications has become non-responsive or unexpectedly terminated based on (a);

c) cause, responsive to (b), a new instance of the first wagering game application to be executed as another one or more second processes separate from the one or more first processes;

d) assign a display window selected from the group consisting of: i) the display window assigned to the instance of the first executing wagering game application and ii) a newly created display window to the new instance of the first wagering game; and e) provide, to the new instance of the first wagering game, the window handle for the display window assigned to the new instance of the first wagering game.

10. The method of claim 8, further comprising:

causing the one or more processors of the electronic gaming machine to, through execution of the one or more wagering game applications, cause each wagering game application to provide game event messages to the gaming platform application indicative of wagering game events in the wagering game provided by that wagering game application; and causing the one or more processors of the electronic gaming machine to, through execution of the gaming platform application, manage one or more of size, location, z-order, and transparency of each of the plurality of the display windows based on the wagering game events.

11. The method of claim 10, wherein:

the one or more wagering games is a plurality of wagering games, and the method further comprises:

causing the one or more processors of the electronic gaming machine to, through execution of the gaming platform application, identify a first wagering game application of the plurality of wagering game applications that has provided a first game event message (i) of the game event messages and (ii) indicating that a winning outcome is to be displayed in the display window assigned to the first wagering game application; and causing the one or more processors of the electronic gaming machine to, through execution of the gaming platform application, modify one or more of the display windows in advance of the display of the winning outcome and responsive to receipt of the first game event message by performing one or more actions selected from the group consisting of: (a) increasing the size of the display window assigned to the first wagering game application, (b) moving the display window assigned to the first wagering game application to a new location on the one or more displays, (c) causing a display window of the plurality of display windows that is not assigned to one of the wagering game applications to display graphical content in a region that surrounds the display window assigned to the first wagering game application, (d) causing the display window assigned to the first wagering game application to cyclically expand and contract in size, and (e) causing one or more display windows of the plurality of display windows that are not assigned to the wagering game applications to display a semi-transparent, uniform color field over all of the display windows assigned to the wagering game applications except for the display window assigned to the first wagering game application.

12. The method of claim 8, further comprising causing the one or more processors of the electronic gaming machine to, through execution of the gaming platform application, output first graphical content on a first display window of the display windows, wherein:

the first display window is not assigned to any of the one or more wagering game applications, and the first graphical content is selected from the group consisting of: (a) a graphical user interface configured to allow a player to select a wagering game for play on the electronic gaming machine from a plurality of wagering games for selection, (b) a graphical user interface for presenting multimedia content offered by an operator of the electronic gaming machine, (c) a graphical user interface for communicating with one or more users of other electronic gaming machines, (d) a graphical user interface for accessing administrative options for the electronic gaming machine, and (e) a graphical user interface for accessing audit functionality offered by the electronic gaming machine.

13. The method of claim 12, further comprising causing the one or more processors of the electronic gaming machine to, through execution of the gaming platform application, output the first graphical content on the first display window while the first display window overlaps with and is on top of at least one or more of the one or more display windows assigned to the one or more wagering game applications.

14. The method of claim 8, further comprising causing the one or more processors of the electronic gaming machine to, through execution of the gaming platform application:

not assign a first display window of the plurality of display windows to any of the wagering game applications, and control the first display window to have a z-order that places the first display window in front of one of the display windows assigned to a wagering game application of the one or more wagering game applications.

15. A computer-readable, non-transitory medium storing one or more computer-executable instructions for controlling one or more processors of an electronic gaming machine having one or more display devices, wherein the computer-executable instructions stored on the computer-readable, non-transitory medium are configured to, when executed by the one or more processors, control the one or more processors to cause:

an operating system for the electronic gaming machine to be executed;

a gaming platform application to be executed as one or more first processes in the operating system;

the gaming platform application to cause a plurality of display windows to be instantiated on the one or more display devices by a window manager of, or executed by, the operating system, each display window having a corresponding window handle;

the gaming platform application to obtain the window handle for each display window instantiated by the gaming platform application;

one or more wagering game applications to be executed as one or more respective second processes in the operating system, wherein the operating system allocates memory to each second process that is separate from memory allocates by the operating system to the one or more first processes;

the gaming platform application to assign a corresponding one of the display windows to each wagering game application of the one or more wagering game applications and to provide each wagering game application with the window handle associated with the display window assigned to that wagering game application; and each wagering game application to output graphical content for a wagering game to the display window associated therewith using the corresponding window handle.

16. The computer-readable, non-transitory medium of claim 15, wherein the computer-readable, non-transitory medium further stores additional computer-executable instructions configured to, when executed by the one or more processors:

a) monitor the one or more second processes of each executing wagering game application;

b) determine whether an instance of a first executing wagering game application of the one or more wagering game applications has become non-responsive or unexpectedly terminated based on (a);

c) cause, responsive to (b), a new instance of the first wagering game application to be executed as another one or more second processes separate from the one or more first processes;

d) assign a display window selected from the group consisting of: i) the display window assigned to the instance of the first executing wagering game application and ii) a newly created display window to the new instance of the first wagering game; and e) provide, to the new instance of the first wagering game, the window handle for the display window assigned to the new instance of the first wagering game.

17. The computer-readable, non-transitory medium of claim 15, wherein the computer-readable, non-transitory medium further stores additional computer-executable instructions configured to, when executed by the one or more processors, control the one or more processors to cause:

each wagering game application to provide game event messages to the gaming platform application indicative of wagering game events in the wagering game provided by that wagering game application; and the gaming platform application to manage one or more of size, location, z-order, and transparency of each of the plurality of the display windows based on the wagering game events.

18. The computer-readable, non-transitory medium of claim 17, wherein:

the one or more wagering games is a plurality of wagering games, and the computer-readable, non-transitory medium further stores additional computer-executable instructions configured to, when executed by the one or more processors, control the one or more processors to cause:

the gaming platform application to identify a first wagering game application of the plurality of wagering game applications that has provided a first game event message (i) of the game event messages and (ii) indicating that a winning outcome is to be displayed in the display window assigned to the first wagering game application; and one or more of the display windows to be modified in advance of the display of the winning outcome and responsive to receipt of the first game event message by performing one or more actions selected from the group consisting of: (a) increasing the size of the display window assigned to the first wagering game application, (b) moving the display window assigned to the first wagering game application to a new location on the one or more displays, (c) causing a display window of the plurality of display windows that is not assigned to one of the wagering game applications to display graphical content in a region that surrounds the display window assigned to the first wagering game application, (d) causing the display window assigned to the first wagering game application to cyclically expand and contract in size, and (e) causing one or more display windows of the plurality of display windows that are not assigned to the wagering game applications to display a semi-transparent, uniform color field over all of the display windows assigned to the wagering game applications except for the display window assigned to the first wagering game application.

19. The computer-readable, non-transitory medium of claim 15, wherein:

the computer-readable, non-transitory medium further stores additional computer-executable instructions configured to, when executed by the one or more processors, control the one or more processors to cause the gaming platform application to output first graphical content on a first display window of the display windows, wherein the first display window is not assigned to any of the one or more wagering game applications, and the first graphical content is selected from the group consisting of: (a) a graphical user interface configured to allow a player to select a wagering game for play on the electronic gaming machine from a plurality of wagering games for selection, (b) a graphical user interface for presenting multimedia content offered by an operator of the electronic gaming machine, (c) a graphical user interface for communicating with one or more users of other electronic gaming machines, (d) a graphical user interface for accessing administrative options for the electronic gaming machine, and (e) a graphical user interface for accessing audit functionality offered by the electronic gaming machine.

20. The computer-readable, non-transitory medium of claim 19, wherein the computer-readable, non-transitory medium further stores additional computer-executable instructions configured to, when executed by the one or more processors, control the one or more processors to cause the gaming platform application to output the first graphical content on the first display window while the first display window overlaps with and is on top of at least one or more of the one or more display windows assigned to the one or more wagering game applications.

* * * * *